United States Patent
Isogawa et al.

(10) Patent No.: US 6,390,030 B1
(45) Date of Patent: May 21, 2002

(54) FUEL REFORMER FOR MOUNTING ON A VEHICLE

(75) Inventors: Ryuhei Isogawa, Aichi-ken; Yasuhiro Nobata, Toyota; Masatsune Kondo, Okazaki; Shigeru Ogino; Kenji Kimura, both of Toyota; Masayoshi Taki, Kounan; Akihisa Nishimura, Ciryu; Masaaki Yamaoka, Toyota; Yoshimasa Negishi, Aichi-ken; Hideo Taguchi; Norihiko Saito, both of Toyota; Atsushi Takumi, Nagoya, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/580,531

(22) Filed: May 26, 2000

(30) Foreign Application Priority Data

| Jun. 3, 1999 | (JP) | ................................. | 11-155901 |
| Sep. 13, 1999 | (JP) | ................................. | 11-258449 |
| Oct. 7, 1999 | (JP) | ................................. | 11-286224 |
| Dec. 10, 1999 | (JP) | ................................. | 11-351535 |
| Feb. 9, 2000 | (JP) | ................................. | 2000-031882 |
| Mar. 21, 2000 | (JP) | ................................. | 2000-077524 |

(51) Int. Cl.[7] ............................................. C01B 3/32
(52) U.S. Cl. ......................................................... 123/3
(58) Field of Search ................................................ 23/3

(56) References Cited

U.S. PATENT DOCUMENTS

| 4,371,500 A | * | 2/1983 | Papineau | ........................ | 123/3 |
| 4,476,818 A | * | 10/1984 | Yoon | .............................. | 123/3 |
| 4,588,659 A | * | 5/1986 | Abens et al. | .................... | 123/3 |
| 4,597,363 A | * | 7/1986 | Emelock | ......................... | 123/3 |
| 4,762,093 A | * | 8/1988 | McCabe et al. | ................. | 123/3 |
| 4,876,989 A | * | 10/1989 | Karpuk et al. | .................. | 123/3 |
| 4,884,531 A | * | 12/1989 | Degnan, Jr. et al. | ............. | 123/3 |
| 5,092,303 A | * | 3/1992 | Brown | ........................... | 123/3 |
| 5,379,728 A | * | 1/1995 | Cooke | ............................ | 123/3 |
| 5,437,250 A | * | 8/1995 | Rabinovich et al. | ............ | 123/3 |

FOREIGN PATENT DOCUMENTS

| JP | A-58-219945 | 12/1983 |
| JP | A-58-223603 | 12/1983 |
| JP | A-04-149002 | 5/1992 |
| JP | A-04-200737 | 7/1992 |
| JP | A-05-76773 | 3/1993 |

* cited by examiner

*Primary Examiner*—Willis R. Wolfe
*Assistant Examiner*—Jason Benton
(74) *Attorney, Agent, or Firm*—Oliff & Berridge, PLC

(57) ABSTRACT

A fuel reformer suited for mounting on a vehicle is provided. A raw material gas containing methanol and water is vaporized at a vaporization section 30. The vaporized gas flows horizontally to a reforming section 60 with monolithic catalyst 70. The reforming section is divided into two sides, a front side 62 and a rear side 64, with an interconnecting pipe 66 bent at 180 degrees, for connecting the front and rear sides. By making the material gas flow horizontally, even when the reformer is mounted to a vehicle which has a larger space in its horizontal direction than in its vertical direction, especially a small passenger car, the contact time period between gas and catalyst can be extended. By bending the reforming section by 180 degrees, the size of the reformer can be reduced so that the reformer is suited for mounting on a vehicle having limited space. Because the vaporization section 30 and the CO reducing section 80 can be placed adjacent to each other, by using heat generated at the CO reducing section, the heat loss during pre-heating of the methanol and water can be reduced.

87 Claims, 31 Drawing Sheets

FUEL REFORMER FOR MOUNTING ON A VEHICLE

BACKGROUND OF THE INVENTION

1. Field of the Invention

The present invention generally relates to a fuel reformer for mounting on a vehicle and more particularly to a reformer for mounting on a vehicle for reforming hydrocarbon fuel to a hydrogen-containing gas using water vapor.

2. Description of the Prior Art

Conventionally, it has been proposed to use a type of fuel reformer for mounting on a vehicle which performs a reforming reaction by causing raw material gas to flow in a vertical direction (for example, refer to Japanese Patent Laid-Open Publication No. Hei 4-200737). In this apparatus, the reforming reaction is performed by spirally wrapping two plate members around a vertically standing, cylindrically-shaped housing to form a catalyst layer and making the raw material gas flow vertically. The fuel reformer is provided around the center of a vehicle, on the left side or on the right side.

However, this type of reformer suffers in that the reformer is not suitable for mounting on a vehicle, especially a small passenger car. In a typical small passenger car, the passenger compartment is provided at the center of the vehicle and the driving devices for the vehicle, including the fuel reformer, are provided in the front or rear side. Thus, if the fuel reformer is vertically provided at the center, it would occupy a portion of the passenger compartment, which forces the passenger compartment to be smaller and in some cases, blocks the driver's field of view. Moreover, because the fuel reformer is generally operated at a high temperature (more than 300° C.), care must be taken so that this heat does not affect the passenger compartment. In a typical vehicle, the horizontal dimension (front/rear direction and right/left direction) of the vehicle is greater than the vertical dimension of the vehicle. When the reforming reaction is performed by making the raw material gas flow vertically, in some cases, contact time of sufficient length for contact between gas and the catalyst cannot be obtained, resulting in inadequate reforming performance.

When any apparatus, including, but not limited to, a fuel reformer, is mounted on a vehicle, various constraints are generated because space in the vehicle is limited and each space plays a particular role. Due to these constraints, some problems arise that are not applicable when the apparatus is not mounted on a vehicle.

SUMMARY OF THE INVENTION

One object of a fuel reformer for mounting on a vehicle according to the present invention is to solve the problems generated when the apparatus is mounted on a vehicle. In other words, some of the objects include, placing a fuel reformer at a suitable space in a vehicle, reducing the size of the fuel reformer for placing it in the limited space, improving fuel reforming efficiency in the fuel reformer, improving ease of maintenance of the fuel reformer, facilitating replacement of each section of the fuel reformer, and simplifying the structure of the fuel reformer.

In order to achieve at least some of the above mentioned objects, the fuel reformer for mounting on a vehicle according to the present invention employs the following.

According to one aspect of the present invention, a fuel reformer for mounting on a vehicle comprises a vaporization section for vaporizing reforming raw material containing hydrocarbon fuel and water, a reforming section for reforming the raw material gas containing the vaporized reforming raw material by a reforming reaction to obtain hydrogen-rich reformed gas, and a carbon monoxide reducing section for reducing the carbon monoxide concentration within the reformed gas to obtain fuel gas, wherein the reformer performs the reforming reaction by making the raw material gas flow in a direction approximately parallel to the floor surface of the vehicle.

In accordance with this aspect of the present invention, by making the material gas flow in a direction approximately parallel to the floor surface of the vehicle for the reforming reaction, the fuel reformer for mounting on a vehicle becomes more suitable for mounting on a vehicle which has a larger degree of freedom in the horizontal direction than in the vertical direction. That is, when the reformer is mounted on a vehicle having its parallel dimension larger than its vertical direction, such as a small passenger car, a reaction container (catalyst layer) can be extended so that there is a sufficiently long contact time between the raw material gas and the catalyst. As a result, the performance of the fuel reformer can be improved.

According to another aspect of the fuel reformer for mounting on a vehicle according to the present invention, the carbon monoxide reducing section can be constructed so that the carbon monoxide concentration within the reformed gas is reduced by making the reformed gas flow in a direction approximately parallel to the floor surface of the vehicle. In this manner, by reducing the carbon monoxide concentration by making the reformed gas flow in a direction approximately parallel to the floor surface of the vehicle, the apparatus becomes more suitable for mounting on a vehicle having a larger degree of freedom in the horizontal direction than in the vertical direction. Moreover, because the reformed gas can contact the catalyst for a sufficiently long period of time, fuel gas with significantly reduced carbon monoxide concentration can be obtained.

According to another aspect of the fuel reformer for mounting on a vehicle according to the present invention, the vaporization section can be constructed so that the reforming raw material is vaporized by causing the reforming raw material to flow in a direction different from the direction of the raw material gas in the reforming section. In this aspect of the present invention, the different direction can be a direction approximately orthogonal.

According to another aspect of the fuel reformer for mounting on a vehicle according to the present invention, the vaporization section, the reforming section, and the carbon monoxide reducing section can be provided sequentially in that order with at least one bending section which bends at a predetermined angle. In this manner, the reformer can be placed in a limited space of a vehicle. In this aspect of the fuel reformer for mounting on a vehicle according to the present invention, the predetermined angle can be approximately 180 degrees. Moreover, in this aspect of the fuel reformer for mounting on a vehicle according to the present invention, the reforming section can be divided into a front side and a rear side with the bending section provided between the front and rear sides of the reforming section, or, alternately, two bending sections can be provided, one between the vaporization section and the reforming section and the other between the reforming section and the carbon monoxide reducing section. According to this aspect of the fuel reformer for mounting on a vehicle according to the present invention, the vaporization section and the carbon monoxide reducing section can be provided adjacent to each other. In this manner, by placing the vaporization section and the carbon monoxide reducing section adjacent to each other for heating the reforming raw material to be supplied to the vaporization section at the carbon monoxide reducing section, heating efficiency can be improved.

According to another aspect of the fuel reformer for mounting on a vehicle according to the present invention, the carbon monoxide reducing section can be configured to heat the reforming raw material before the reforming raw material is supplied to the vaporization section using heat generated by the reduction of carbon monoxide. In this manner, the reforming raw material can be heated while the carbon monoxide reducing section is cooled, and energy efficiency can thus be improved. In this aspect of the fuel reformer for mounting on a vehicle according to the present invention, the carbon monoxide reduction section can be configured to heat the reforming raw material by making the reforming raw material flow in a direction approximately perpendicular to the flow of the reformed gas. In this aspect of the fuel reformer for mounting on a vehicle according to the present invention, the carbon monoxide reducing section can be formed to have an approximate rectangular prism shape.

According to another aspect of the fuel reformer for mounting on a vehicle according to the present invention, the vaporization section can be configured to vaporize the reforming raw material by heat exchange with a combustion gas flowing through a combustion catalyst layer carrying combustion catalysts for combusting fuel. In this aspect of the fuel reformer for mounting on a vehicle according to the present invention, the vaporization section can be configured to vaporize the reforming raw material by making the reforming raw material flow in a direction approximately perpendicular to the flow of the fuel and the combustion gas. In this aspect of fuel reformer for mounting on a vehicle according to the present invention, the vaporization section can be provided with the combustion catalyst layer in a portion of a folded flow path. In this manner, the heat exchange efficiency can be improved. In these aspects of the fuel reformer for mounting on a vehicle according to the present invention, the vaporization section can be constructed in an approximate rectangular prism shape. In an aspect of the fuel reformer for mounting on a vehicle according to the present invention where the reforming raw material is vaporized by heat exchange with the combustion gas, the fuel reformer can further comprise a combustion gas temperature detector for detecting the temperature of the combustion gas and first vaporization control means for controlling operation of the vaporization section so that the detected temperature of the combustion gas is at a target temperature, preset for the combustion gas. In this manner, the combustion gas can be controlled to be at the target temperature. The target temperature is determined from the type of reforming raw material used in the fuel reformer and operational condition of the fuel reformer, etc.

According to another aspect of the fuel reformer for mounting on a vehicle according to the present invention, the fuel reformer can further comprise a first oxygen-containing gas supplier for supplying oxygen-containing gas to the reforming raw material vaporized at the vaporization section so that the raw material gas is obtained. With this configuration, a portion of hydrocarbon fuel contained in the reforming raw material can be partially oxidized. Because the water vapor reforming reaction of hydrocarbon fuel is generally endothermic, heat is required to promote the reaction. Also, because the catalyst to be filled in the reformer has a predetermined activating temperature, the temperature of the catalyst must be at a temperature within the predetermined activating temperature range. The reformer thus requires heat, and in this aspect of the present invention, the heat required for the reforming reaction and for maintaining the catalyst at a temperature within its activating temperature range can be obtained by supplying an oxygen-containing gas and partially oxidizing a portion of the hydrocarbon fuel.

In the aspect of the fuel reformer for mounting on a vehicle according to the present invention which includes a first oxygen-containing gas supplier, the first oxygen-containing gas supplier can be configured to mix the vaporized reforming raw material and the oxygen-containing gas by swirling. In this manner, the raw material gas becomes a homogeneous mixture of vaporized reforming raw material and supplied oxygen-containing gas. In this aspect of the fuel reformer for mounting on a vehicle according to the present invention which has a first oxygen-containing gas supplier, the first oxygen-containing gas supplier can be formed to mix the oxygen-containing gas to the vaporized reforming raw material by injecting the oxygen-containing gas in a direction perpendicular to the flow of the vaporized reforming raw material. In this manner, the reforming raw material and the oxygen-containing gas can be uniformly mixed. In this aspect of the fuel reformer for mounting on a vehicle according to the present invention, the first oxygen-containing gas supplier can further comprise a supply pipe approximately in the middle of and parallel to the flow of the vaporized reforming raw material, wherein the oxygen-containing gas is injected and mixed from the external surface of the supply pipe in a direction perpendicular to the flow.

In the aspect of the fuel reformer for mounting on a vehicle according to the present invention which has a first oxygen-containing gas supplier, the reforming section can further be divided into at least two sides, front and rear, with an oxygen-containing gas supplier for supplying the oxygen-containing gas at the outer area around the entrance of the rear side. In this manner, by partially oxidizing a portion of hydrocarbon fuel contained in the reforming raw material at the rear side of the reforming section, the heat required for the reaction at the rear side and for maintaining the temperature within a temperature range where the catalyst at the rear side is activated can be obtained. Furthermore, in accordance with an aspect of the fuel reformer for mounting on a vehicle according to the present invention which has a first oxygen-containing gas supplier, the reforming section can be formed to perform the reforming reaction as well as performing partial oxidation reaction for partially oxidizing a portion of hydrocarbon fuel using oxygen-containing gas supplied by the first oxygen-containing gas supplier. In this manner, the reforming reaction can be performed with a supply of heat required for the reforming reaction and for maintaining the temperature within a temperature range where the catalyst is activated. Thus, the reformer can be simplified compared to a reformer having a separate section for supplying heat required for the reforming reaction and for maintaining the temperature within an activation temperature range of the catalyst, and the size of the reformer can be reduced.

In an aspect of the fuel reformer for mounting on a vehicle according to the present invention which has a first oxygen-containing gas supplier, the fuel reformer can further comprise a raw material gas temperature detector for detecting the temperature of the raw material gas and a second vaporization control means for controlling the operation of the vaporization section so that the temperature of the raw material gas detected by the detector is set at a target temperature preset for the raw material gas. In this manner, the raw material gas can be controlled to be at a target temperature. The target temperature is preset depending on several factors including, but not limited to, the type of catalysts used at the reforming section, the reforming reaction performed at the reforming section, the type of reforming raw material used by the fuel reformer, and the operating condition of the fuel reformer. In this aspect of the fuel reformer for mounting on a vehicle according to the present invention, the second vaporization control means can be configured to control the supply amount of the oxygen-containing gas by the first oxygen-containing gas supplier.

In an aspect of the fuel reformer for mounting on a vehicle according to the present invention which has a first oxygen-containing gas supplier, the fuel reformer can further comprise a second oxygen-containing gas supplier for supplying oxygen-containing gas to the reformed gas, a reformed gas temperature detector for detecting the temperature of the reformed gas, and a gas supply amount control means for controlling the amount of oxygen-containing gas supplied by the second oxygen-containing gas supplier based on the detected temperature of the reformed gas. In this manner, reduction of carbon monoxide concentration within the reformed gas at the carbon monoxide reducing section can be efficiently performed. In this aspect of the reformer for mounting on a vehicle according to the present invention, the gas supply amount control means can be configured to control the supply amount of the oxygen-containing gas by the first oxygen-containing gas based on the temperature detected by the reformed gas temperature detector.

According to this aspect of the fuel reformer for mounting on a vehicle according to the present invention which has a second oxygen-containing gas supplier, the second oxygen-containing gas supplier can be configured to supply the oxygen-containing gas by injecting it in a direction perpendicular to the flow of the reformed gas. In this manner, the oxygen-containing gas can be supplied uniformly to the reformed gas. In this aspect of the present invention, the second oxygen-containing gas supplier can be provided with a supply pipe approximately in the middle of and along the flow of the reformed gas, with the supply pipe supplying the oxygen-containing gas by injecting it in a direction perpendicular to the flow from the outer surface of the supply pipe.

According to another aspect of the fuel reformer for mounting on a vehicle according to the present invention, the reforming section can be provided with an insulation layer at its outer edge. In this manner, the heat does not escape outside and the heat loss can be reduced. According to another aspect of the fuel reformer for mounting on a vehicle according to the present invention, the reforming section can be filled with a monolithic catalyst formed by carrying catalysts on a monolith carrier. Because a monolithic catalyst is formed by carrying catalysts on a honeycomb shaped carrier having various types of cross sections, it does not suffer in having spaces in an upper portion when the reforming section is horizontally placed, a problem which occurs in catalysts carried on pellets. Moreover, because it allows for more uniform gas flow, all of the catalysts can be more uniformly used, improving the reforming efficiency. In an aspect of a fuel reformer for mounting on a vehicle according to the present invention with a reforming section having an insulation layer on its outer edge and filled with a monolithic catalyst, the insulation layer can be formed by blocking the entrance and/or exit section of the cell positioned at the outer edge of the monolithic catalyst. In this manner, the construction and assembly of the insulation layer can be simplified. In this aspect of the fuel reformer for mounting on a vehicle according to the present invention having the reforming section filled with monolithic catalyst, the reforming section can be constructed by filling the reforming section with a plurality of catalysts, formed by dividing the monolithic catalyst. In this manner, gas flow is disturbed between the divided monolithic catalysts, resulting in more uniform gas flow and promotion of contact between the unreacted gas and the catalyst, thus improving the reforming efficiency. In this aspect of the fuel reformer for mounting on a vehicle according to the present invention having reforming section filled with monolithic catalyst, the reforming section can be constructed in an approximately cylindrical shape. In this manner, the raw material gas can flow more uniformly, improving the reforming efficiency.

According to another aspect of the fuel reformer for mounting on a vehicle according to the present invention, the reforming section can further comprise a liquid collecting section near the flow entrance for the raw material gas. In this manner, even when a portion of reforming raw material etc. forming the raw material gas is liquefied, the liquid can be accumulated at the liquid collecting section. As a result, performance reduction of the catalyst at the reforming section due to liquefied reforming raw material etc. can be prevented. In an aspect of the fuel reformer for mounting on a vehicle according to the present invention having the reforming section divided into two sides, the reforming section can further comprise another liquid collecting section near the flow entrance of the rear side. In this manner, even when a portion of reforming raw material etc. forming the gas flowing into the rear side is liquefied, the liquefied gas can be accumulated at the liquid collecting section. As a result, performance degradation of the catalyst in the rear side of the reforming section due to liquefied reforming raw material can be prevented. In another aspect of the fuel reformer for mounting on a vehicle according to the present invention having reforming section filled with a plurality of divided monolithic catalysts, the reforming section can further comprise liquid collecting sections between the divided monolithic catalysts filling the reforming section. In this manner, even when a portion of reforming raw material etc. forming the raw material gas is liquefied in the reforming section, the liquid can be accumulated in the liquid collecting section. As a result, performance degradation of the monolithic catalysts at the rear side due to the liquefied reforming raw material can be prevented. In this aspect of the fuel reformer for mounting on a vehicle according to the present invention, the liquid collecting section can be constructed as a container that holds the monolithic catalysts. In this manner, the monolithic catalyst can be held and sliding of the monolithic catalyst due to the vehicle running etc. can be prevented. In these aspects of the fuel reformer for mounting on a vehicle according to the present invention having liquid collecting sections, the liquid collecting section can be constructed as a container having a concave channel formed at the flow path of the raw material gas in the reforming section. In an aspect of the fuel reformer for mounting on a vehicle according to the present invention in which the monolithic catalyst is divided into a plurality of monolithic catalysts to fill the reforming section, the liquid collecting section can comprise a convex channel formed inside the case filled with the monolithic catalysts.

According to another aspect of the fuel reformer for mounting on a vehicle of the present invention, the carbon monoxide reducing section can further be provided with a liquid collecting section near the flow entrance of the reformed gas. In this manner, even when reforming raw material etc. which forms a portion of unreacted raw material gas is liquefied, the liquefied gas can be collected at the liquid collecting section. As a result, performance degradation of the catalyst at the carbon monoxide reducing section due to liquefied reforming raw material etc. can be prevented. In this aspect of the fuel reformer for mounting on a vehicle according to the present invention, the liquid collecting section can be provided with a concave channel formed at the flow path of the reformed gas in the carbon monoxide reducing section.

In this aspect of the fuel reformer for mounting on a vehicle according to the present invention which includes a liquid collecting section, the liquid collecting section can be constructed to have a liquid pool for collecting liquid integrated with the case. In this manner, the number of assembly steps can be reduced. In this aspect of the fuel reformer for mounting on a vehicle according to the present invention, the liquid pool can be formed by pressing or spinning during the formation of the case.

According to another aspect of the fuel reformer for mounting on a vehicle of the present invention, the reforming section can further comprise a raw material gas heater near the flow entrance of the raw material gas for heating the raw material gas. In this manner, catalysts for reforming reaction can be quickly heated at the time of start-up to their activation temperature and the reformer can quickly be brought to its steady operation state. In this aspect of the fuel reformer for mounting on a vehicle according to the present invention, the reforming section can be divided into at least two sides, front and rear, and can comprise an intermediate gas heater provided between the front and rear sides for heating the gas from the front side. In this manner, heat required for the reaction at the rear side can be supplied. In these aspects of the fuel reformer for mounting on a vehicle of the present invention, the raw material gas heater and/or intermediate gas heater can be configured to partially oxidize a portion of the hydrocarbon fuel within the raw material gas. In this manner, heat can be obtained without using other fuel, and, as a result, the apparatus can be simplified and the size of the apparatus can be reduced.

According to another aspect of the fuel reformer for mounting on a vehicle according to the present invention, the fuel reformer can further comprise a heater for heating the carbon monoxide reducing section. In this manner, the carbon monoxide reducing section can quickly be heated at the time of start-up. In this aspect of the fuel reformer for mounting on a vehicle of the present invention, the heater can be configured to include an igniter for combusting hydrogen contained within the reformed gas, and to heat the carbon monoxide reducing section by the heat generated by the hydrogen combustion. In this manner, heat can be obtained without other fuel. As a result, even when the fuel reformer is configured to quickly heat the carbon monoxide reducing section at the time of start-up, the device can be simplified, while being reduced in size.

According to another aspect of the fuel reformer for mounting on a vehicle of the present invention, the reforming section can further comprise a dividing section for dividing the reforming section into two sides, front and rear, and a dividing section gas supplier for supplying oxygen-containing gas to the dividing section. In this manner, the rear side of the reforming section can also be heated at the time of start-up, as well as the front side. In this aspect of the fuel reformer for mounting on a vehicle of the present invention, the dividing section gas supplier can be configured to disturb the gas flow at the dividing section by supplying the oxygen-containing gas. In this manner, the oxygen-containing gas can be more uniformly distributed. In the aspect of the fuel reformer for mounting on a vehicle of the present invention having a dividing section gas supplier, the dividing section can further include a bending section for bending in a predetermined angle and the dividing section gas supplier can be provided in contact with the inner surface of the outer wall of the bending section. In this manner, gas can be prevented from flowing nonuniformly through the bending section and can flow more uniformly.

In this aspect of the fuel reformer for mounting on a vehicle of the present invention in which the dividing section is provided with a bending section, the dividing section gas supplier can further comprise a plurality of nozzles for injecting the oxygen-containing gas at a predetermined angle with respect to the gas flow in the bending section. In this manner, the oxygen-containing gas can be supplied more uniformly. In this aspect of the fuel reformer for mounting on a vehicle of the present invention, the dividing section gas supplier can be formed by processing a tube or by forming a hollow structure using a pressing or welding process.

In the aspect of the fuel reformer for mounting on a vehicle according to the present invention in which the dividing section is provided with a bending section, the dividing section can further comprise a flow adjusting device for adjusting the gas flow direction within the bending section. In this manner, the gas flow direction at the bending section can be adjusted and the gas can be more uniformly supplied to the rear side. In this aspect of the fuel reformer for mounting on a vehicle of the present invention, the flow adjusting device can be a channel formed in convex shape at the interior of the bending section.

According to another aspect of the fuel reformer for mounting on a vehicle according to the present invention, the fuel reformer can further comprise heating means for heating the reforming section which is placed to wrap the reforming section. The reforming section can thus be heated. By configuring the fuel reformer so that the reforming section is heated at its start-up, the fuel reformer can quickly be brought to its steady operation state, and the start-up performance can be improved.

In the aspect of the fuel reformer for mounting on a vehicle according to the present invention which includes a heater, the reforming section can have a double layered structure comprising an inner casing and an outer casing, and the heater can be placed in the space between the inner and outer casings of the double layered structure.

In the aspect of the fuel reformer for mounting on a vehicle according to the present invention which includes a heater, the heater can comprise a heating element for generating heat by oxidation and an oxidizing gas supplier for supplying oxidizing gas to the heating element so that the heating element can oxidize. In this manner, the reforming section can be heated by merely supplying oxidizing gas.

In the aspect of the fuel reformer for mounting on a vehicle according to the present invention in which the heater includes a heating element, the heater can further comprise start-up control means for controlling the oxidizing gas supplier so that oxidizing gas is supplied to the heating element at the time of start-up of the reforming section. In this manner, the reforming section can quickly be brought to its steady operation state.

In the aspect of the fuel reformer for mounting on a vehicle according to the present invention in which the heater includes a heating element, the heater can further comprise a reforming temperature detecting sensor for detecting the temperature of the reforming section and oxidation control means for controlling the supply of the oxidizing gas by the oxidizing gas supplier based on the detected temperature. In this manner, heating of the reforming section by the heater can be controlled based on the temperature of the reforming section.

Alternatively, in the aspect of the fuel reformer for mounting on a vehicle according to the present invention in which the heater includes a heating element, the heater can further comprise a deoxidizing gas supplier which can supply deoxidizing gas to the heating element for deoxidizing the heating element. In this manner, the oxidation and deoxidation of the heating element can be repeated. In other words, heating of the reformer by oxidation of the heating element can be repeated.

In the aspect of the fuel reformer for mounting on a vehicle according to the present invention in which the heater includes a deoxidizing gas supplier, the heater can further comprise termination control means for controlling the deoxidizing gas supplier at the termination of the operation of the reformer so that the deoxidizing gas is supplied to the heating element at the termination of the operation of the reforming section. In this manner, the heating element can be deoxidized when the operation of the reforming section is terminated. In other words, the heating element can be deoxidized so that the heating element is ready to be oxidized at the next start-up of the reforming section. In this aspect of the fuel reformer for mounting on a vehicle according to the present invention, the deoxidizing gas supplier can be supplying means for supplying, as the deoxidizing gas, fuel gas formed by reforming raw material gas remaining in the vaporization section and unreacted raw material gas remaining in the reforming section when the termination of the operation of the reforming section is instructed. In this manner, the fuel gas formed by reforming the unreacted raw material gas can be processed and used effectively.

In the aspect of the fuel reformer for mounting on a vehicle according to the present invention including a deoxidizing gas supplier, the heater can further comprise a heating element temperature detecting sensor for detecting the temperature of the heating element and deoxidation control means for controlling the supply of the deoxidizing gas by the deoxidizing gas supplier based on the detected temperature. In this manner, because the deoxidation reaction of the heating element is generally either exothermic or endothermic, by controlling the supply of deoxidizing gas based on the temperature of the heating element, the temperature of reforming means can be adjusted. Thus, by configuring the reforming section to adjust to a temperature where the reforming section can effectively operate, unreacted raw material gas in the reforming section can be reformed.

According to another aspect of the fuel reformer for mounting on a vehicle according to the present invention, the vaporization section, the reforming section, and the carbon monoxide reducing section can each be constructed as a separate unit with a connector for connecting to the other units. In this manner, ease of maintenance can be improved. It also enables simple exchange of each of the sections. In this aspect of the fuel reformer for mounting on a vehicle according to the present invention, the connector can be constructed from a flange and a V-shaped band for fastening the flange. Because fastening by a V-shaped band has a small heat capacity in general, heat loss can be reduced. Moreover, it allows more uniform sealing and the size of the device can be reduced.

In the aspect of the fuel reformer for mounting on a vehicle according to the present invention having each of the vaporization section, reforming section, and carbon monoxide reducing section constructed as a separate unit, the connector can include a member holding structure for holding the members at the time of connection. In this manner, the members can be held during the connection of the separate units, and the assembly can be simplified. Here, "members" include not only the members that are not included in each of the units, but also the members included in each of the units such as, for example, a gasket.

In this aspect of the fuel reformer for mounting on a vehicle according to the present invention where the vaporization, reforming, and carbon monoxide reducing sections are each provided as a separate unit, at least one of the unitized vaporization, reforming, and carbon monoxide sections can be constructed from a plurality of parts, each of which is provided as a separate unit. In this manner, assembly of a plurality of separate units can be simplified and the operational ease during manufacturing can be improved. In this aspect of the fuel reformer for mounting on a vehicle according to the present invention, the reforming section can comprise a flow rate unifying section for making the flow rate of the raw material gas uniform, a raw material gas heating section for heating the raw material gas, and a catalyst section having a catalyst for reforming supplied raw material gas, each of which is separately provided as a unit.

According to another aspect of the fuel reformer for mounting on a vehicle according to the present invention, the reforming raw material can be a liquid mixture of water and methanol and the raw material gas can be a mixture gas of the vaporized reforming raw material and oxygen-containing gas.

BRIEF DESCRIPTION OF THE DRAWING(S)

DESCRIPTION OF PREFERRED EMBODIMENTS

Figure 1:
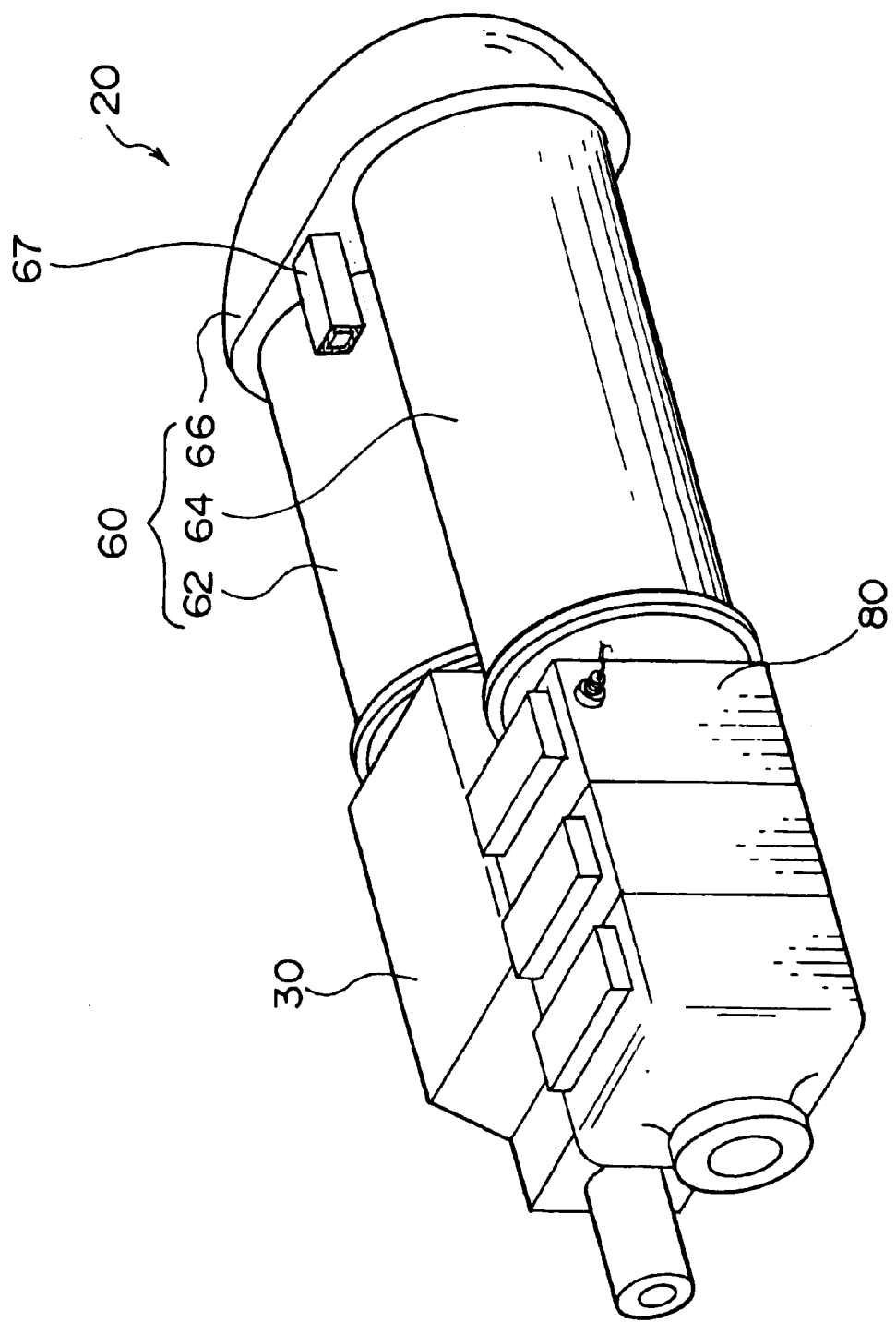
FIG. 1 is a structural diagram schematically showing a structure of a fuel reformer 20 for mounting on a vehicle according to the present invention.
Figure 2:
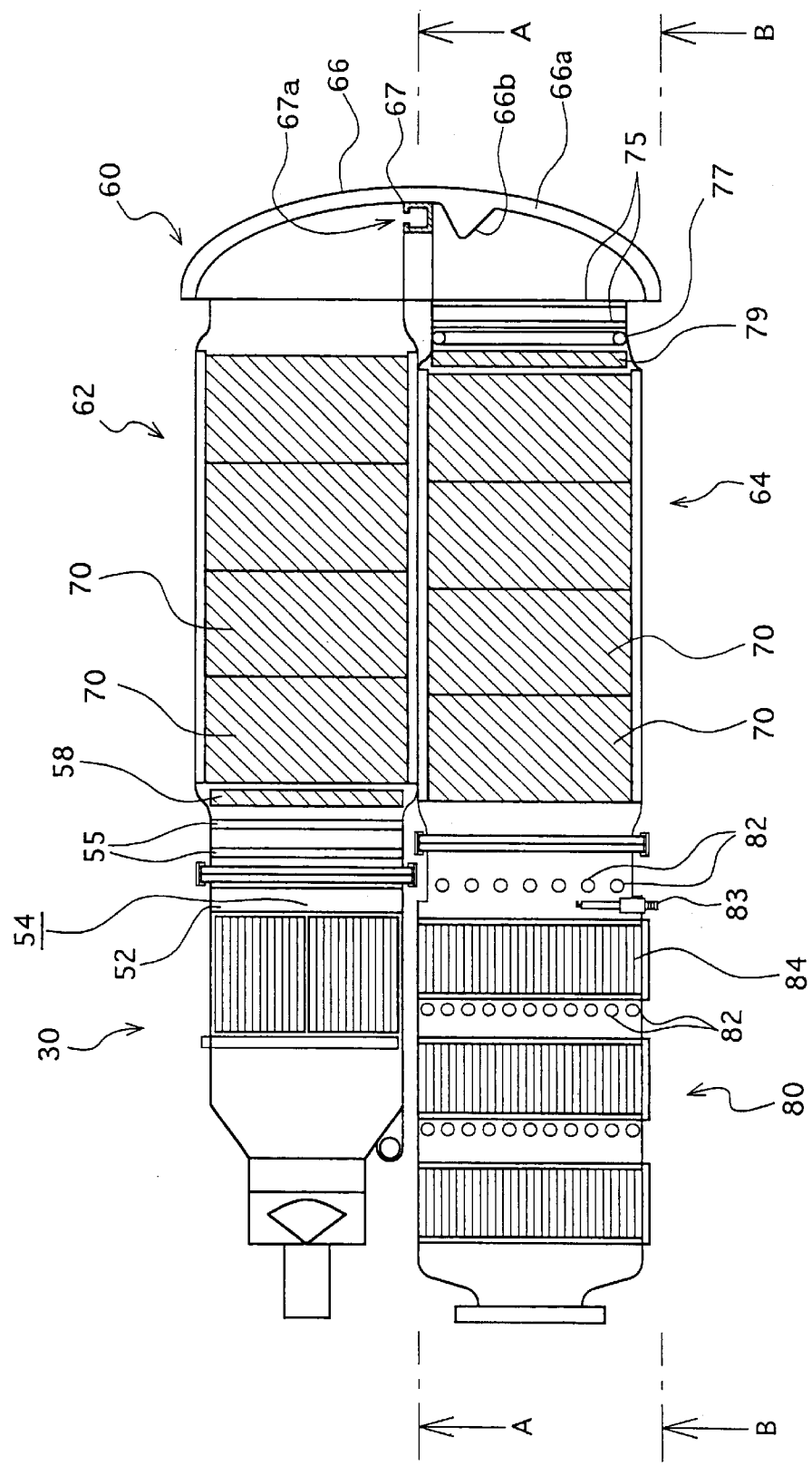
FIG. 2 is a cross sectional diagram showing a fuel reformer 20 of the present invention in horizontal plane.
Figure 3:
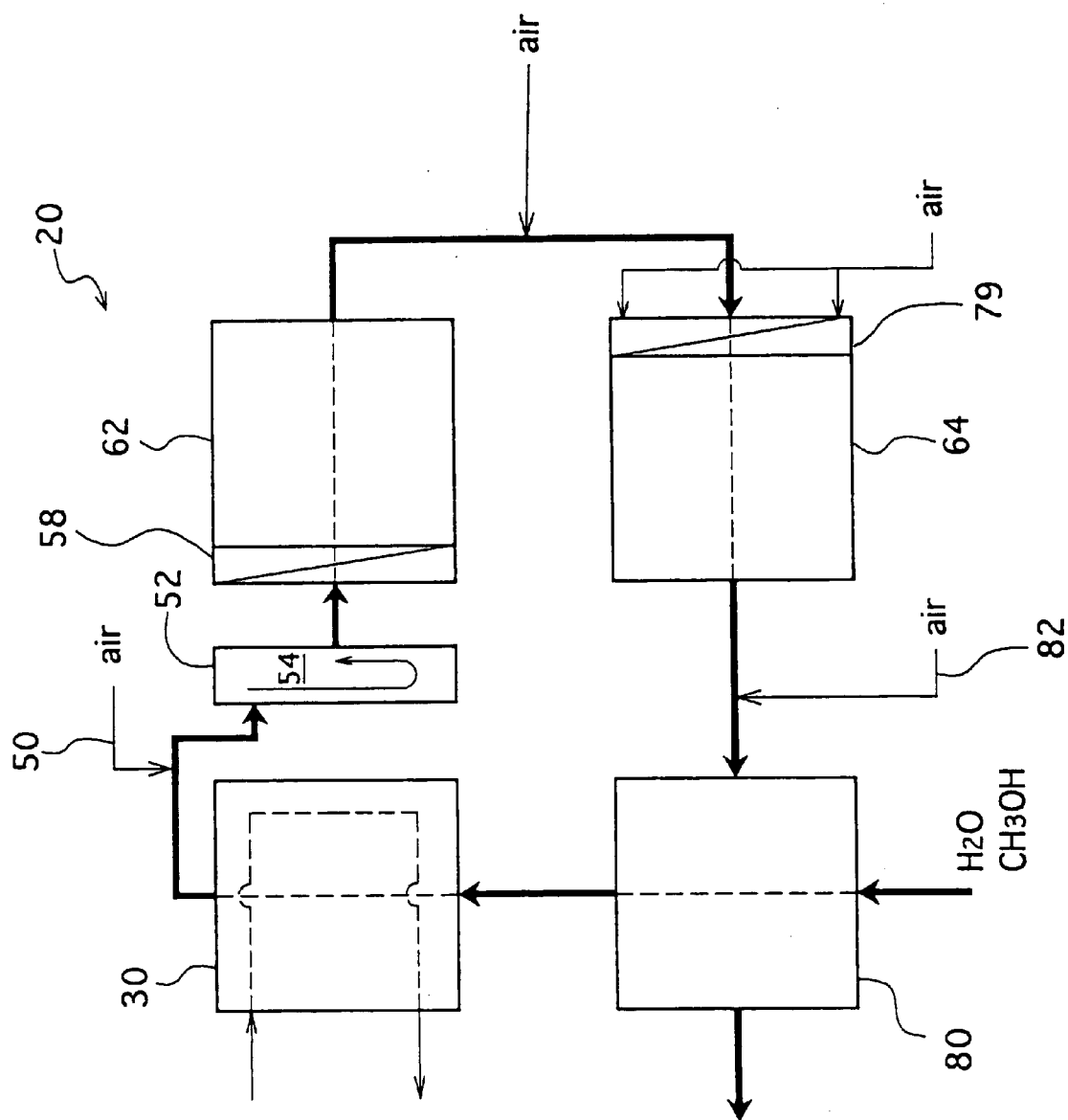
FIG. 3 is a diagram schematically showing gas flow within a fuel reformer 20.

The preferred embodiments of the present invention are described next. FIG. 1 is a structural diagram schematically showing a structure of a fuel reformer 20 for mounting on a vehicle of one embodiment of the present invention. FIG. 2 is a cross sectional diagram showing a cross section of the fuel reformer 20 of the embodiment in the horizontal direction. FIG. 3 is a diagram schematically showing the gas flow in the fuel reformer 20 of the embodiment. As shown in the figure, the fuel reformer 20 for mounting on a vehicle according to the embodiment comprises a vaporization section 30 for vaporizing reforming raw material formed from water and methanol acting as a hydrocarbon fuel, a reforming section 60 for reforming raw material gas formed by supplying air as an oxygen-containing gas to the vaporized reforming raw material into a hydrogen-rich reformed gas, and a CO reducing section 80 for reducing the carbon monoxide concentration in the reformed gas so that a fuel gas which is rich in hydrogen and has a very low carbon monoxide concentration is obtained. Here, the reforming section 60 is divided into two sides, a reforming front side 62 and a reforming rear side 64, and these two sides are interconnected by an interconnecting pipe 66 which changes the gas flow by 180 degrees.

Before a detailed explanation of each section, gas flow in the fuel reformer 20 of the embodiment is explained. As shown in FIG. 3, the reforming raw material formed by mixing methanol and water in a predetermined mixing ratio is first introduced to the CO reducing section 80 and heated using the heat generated when carbon monoxide is oxidized. The heated reforming raw material is then supplied to the vaporization section 30 and vaporized by heat exchange with combustion gas. The vaporized reforming raw material is then supplied with air acting as an oxygen-containing gas by an air supply pipe 50 which supplies air so that the ratio of the air to methanol is at a predetermined value and the vaporized reforming raw material becomes a raw material gas for performing the reforming reaction. The raw material gas is then supplied to a swirl stirrer 52 where it is uniformly mixed by the swirling effect. The uniformly mixed raw material gas is then supplied to the reforming section 60, where the raw material gas is reformed to a reformed gas rich in hydrogen by a reforming reaction represented by equation 1 and a partial oxidation reaction represented by equation 2. The reformed gas is then supplied to the CO reducing section 80 where unreacted carbon monoxide is oxidized by oxygen within supplied air acting as an oxygen-containing gas, to result in a fuel gas which is rich in hydrogen and has a very low carbon monoxide concentration.

$$CH_3OH+2H_2O \rightarrow 3H_2+CO_2+H_2O+(CO)-49.5 \text{ kJ} \quad \text{Equation 1}$$

$$CH_3OH+(1/2)O_2 \rightarrow CO_2+2H_2+189 \text{ kJ} \quad \text{Equation 2}$$

Figure 4:
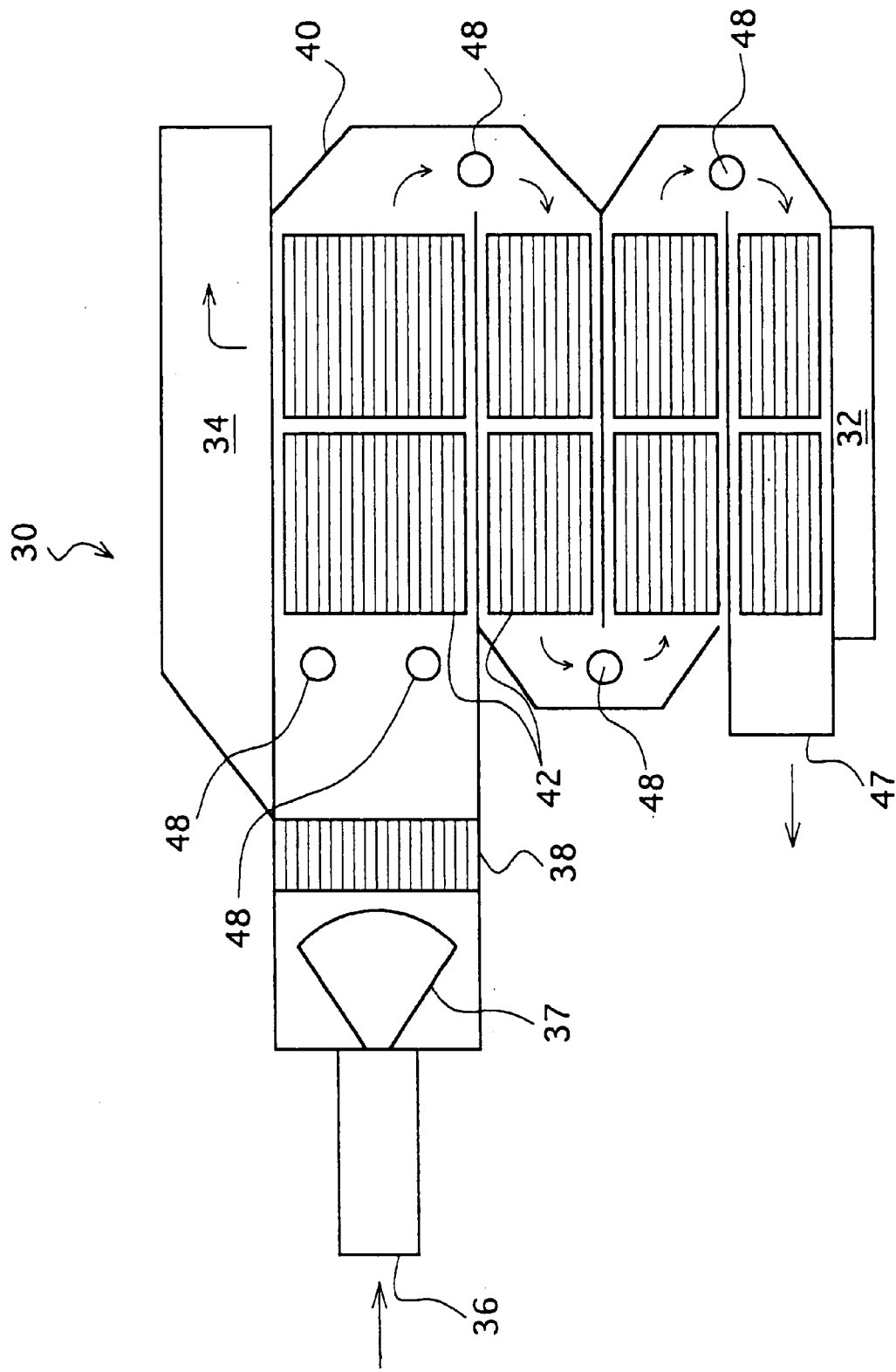
FIG. 4 is a cross sectional diagram schematically showing a cross section in vertical direction of a vaporization section 30.
Figure 5:
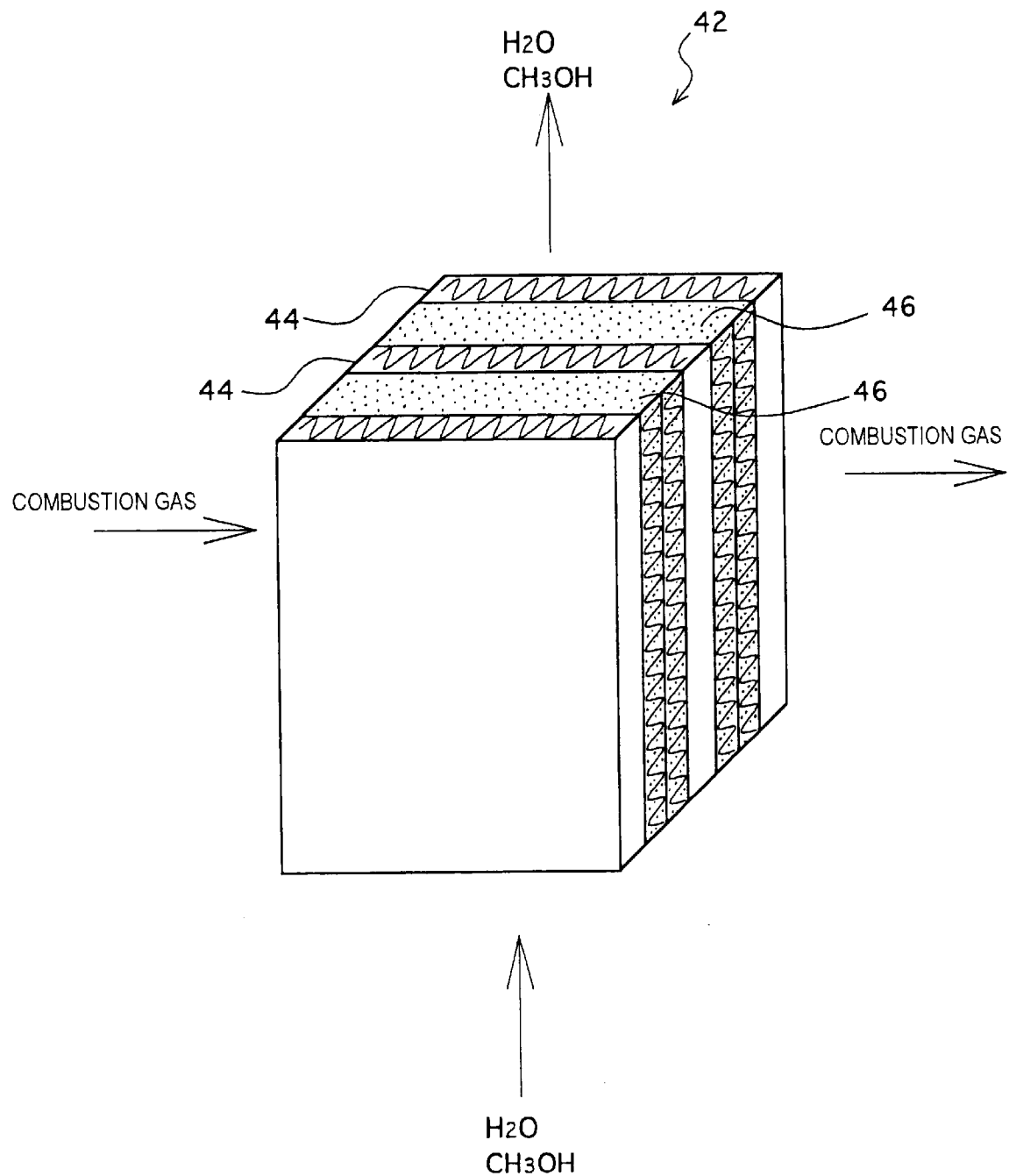
FIG. 5 is a structural diagram exemplifying a structure of a heat exchanger 42 of a vaporization section 30.

The vaporization section 30 combusts fuel using catalyst to generate heat of combustion and vaporizes the reforming raw material using the heat of combustion. FIG. 4 schematically shows a cross section of the vaporization section 30 in a perpendicular direction. As shown in the figure, in the vaporization section 30, the fuel supplied from the fuel supply entrance 36 is sprayed by a sprayer 37, heated by a heater 38, flows through a folded heat exchange flow path 40, combusted on the combustion catalyst carried on heat exchangers 42 provided within the heat exchange flow path 40, and discharged from a discharge exit 47 as a combustion gas. The reforming raw material formed from methanol and water, on the other hand, is supplied from a reforming raw material supply entrance 32, vaporized by heat exchanging with the combustion gas at the heat exchanger 42, and discharged from a reforming raw material exit 34 towards the reforming section 60. A structure of the heat exchanger 42 is shown in FIG. 5. As shown, the heat exchanger 42 is constructed by alternately layering reforming raw material flow path members 44 having wave-shaped plates with exits on the top and bottom of the figure, and fuel flow path members 46 also having wave-shaped plates with exits on the right and left of the figure. The wave-shaped plate of the fuel flow path member 46 carries a combustion catalyst such as a platinum catalyst, for example, for combusting the fuel so that the fuel is combusted on the combustion catalyst when the fuel flows through the fuel flow path member 46. Because the reforming raw material flow path members 44 and the fuel flow path members 46 are alternately layered, the reforming raw material formed by methanol and water and flowing vertically from bottom to top is heated by heat exchange with the combustion gas flowing from left to right through the fuel flow path member 46. As explained, in the vaporization section 30, the reforming raw material is vaporized by heat exchange between the reforming raw material flowing vertically from bottom to top and the fuel and combustion gas flowing in a direction perpendicular to the reforming raw material, that is, in the horizontal direction. Therefore, a rectangular prism shape is preferred as the shape of the vaporization section 30. In FIG. 4, a supply pipe 48 is also shown for using hydrogen, which is not consumed at a fuel cell as fuel, at the vaporization section 30 when the fuel reformer 20 of the embodiment is combined with the fuel cell.

Figure 6:
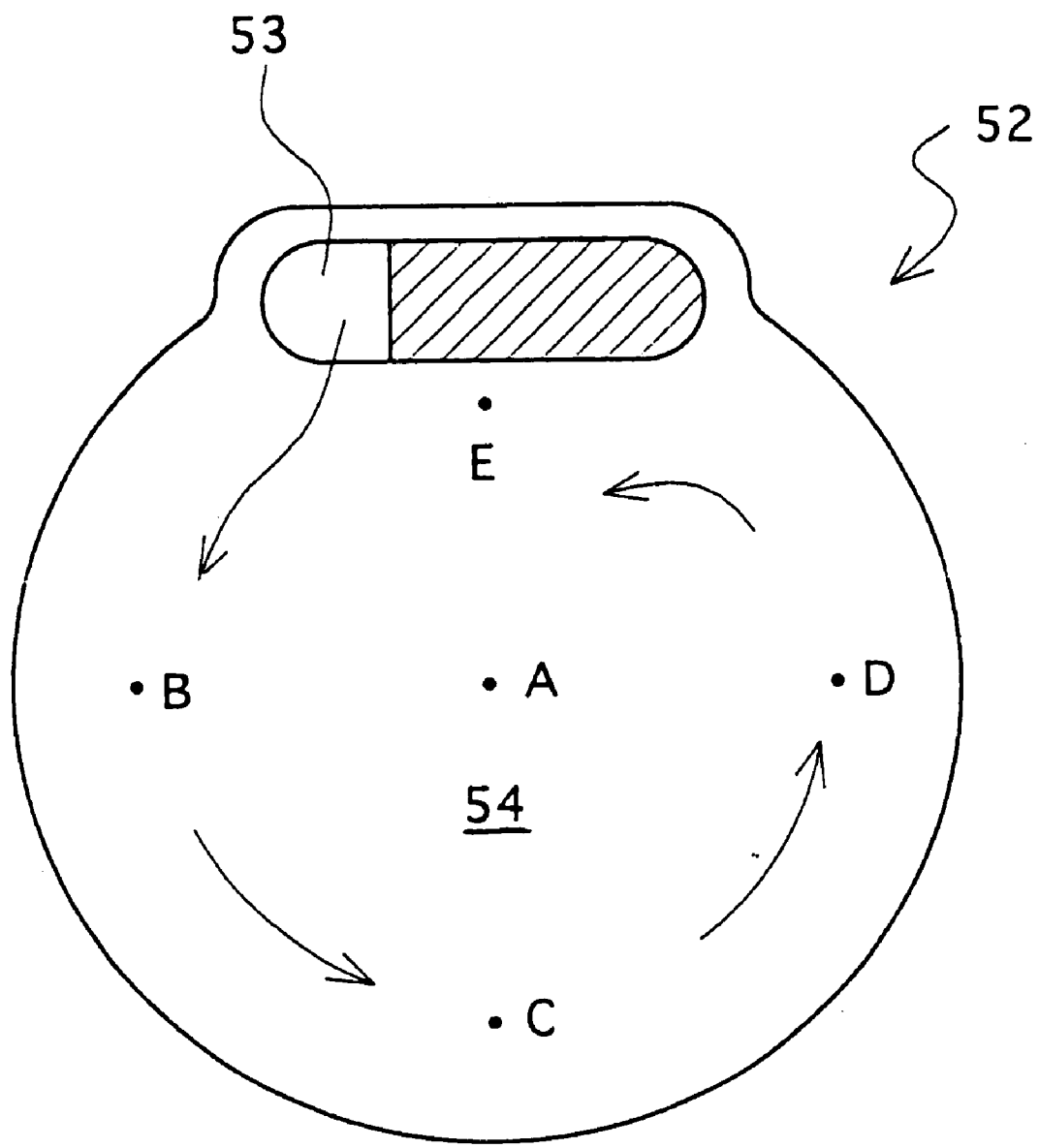
FIG. 6 is a diagram exemplifying stirring of the raw material gas at a swirl stirrer 52.
Figure 7:
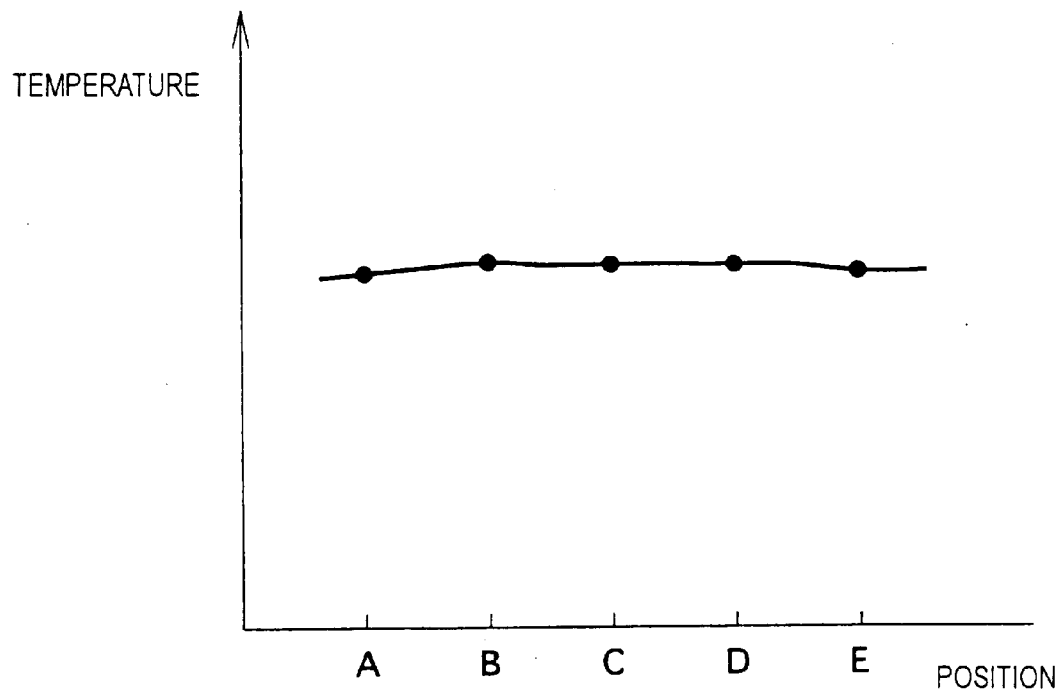
FIG. 7 is a diagram showing one example of temperature distribution of raw material gas at each position of a stirring chamber 54 with swirling.
Figure 8:
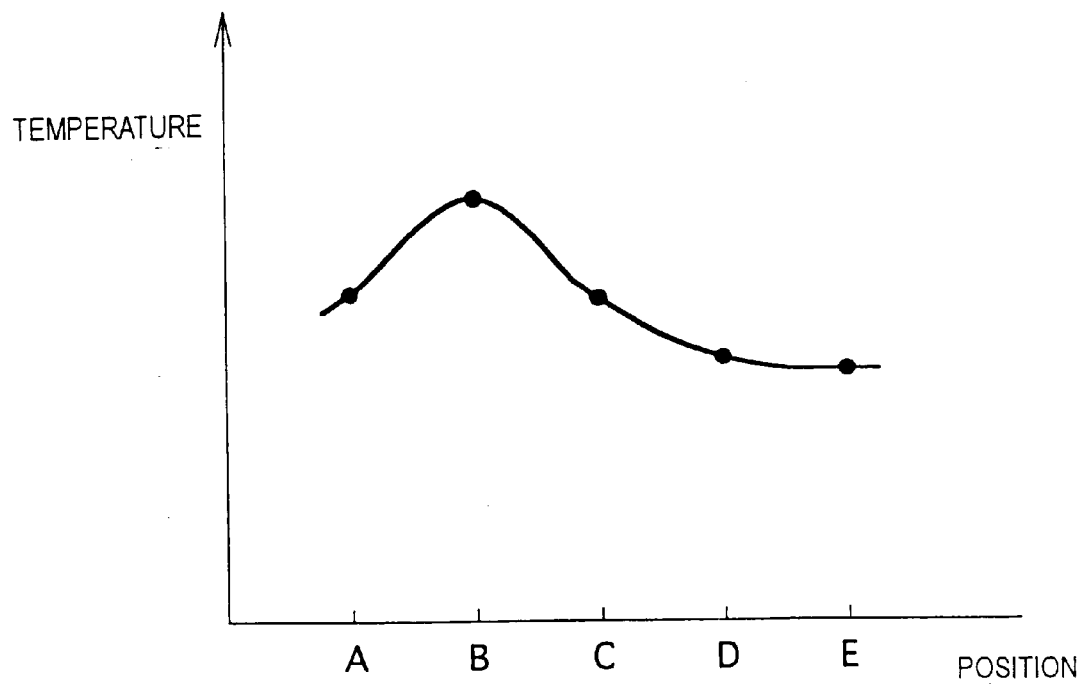
FIG. 8 is a diagram showing one example of temperature distribution of raw material gas at each position of a stirring chamber 54 without swirling.

A swirl stirrer 52 is provided to uniformly stir the raw material gas formed from the reforming raw material vaporized at the vaporization section 30 and air supplied from an air supply pipe 50. FIG. 6 shows stirring of the raw material gas by the swirl stirrer 52. As shown in the figure, in the swirl stirrer 52, the raw material gas is supplied to a stirring chamber 54 from the entrance 53 shown at the top. The raw material gas swirls in the stirring chamber 54, as indicated by the arrows in the figure, so that the reforming raw material and the supplied air are uniformly mixed. The temperature of the raw material gas at each position within the stirring chamber 54 with swirling is shown in FIG. 7, and the temperature of the raw material gas at the same position, but without swirling, is shown in FIG. 8. In these figure, labels A, B, C, D, and E respectively correspond to the positions in the stirring chamber 54 shown in FIG. 6 having the same label. As shown in FIG. 7, the raw material gas has approximately uniform temperature throughout all of the positions within the stirring chamber 54. This is an indication that the heated and vaporized reforming raw material and unheated air are uniformly mixed. When it is not swirled, on the other hand, the temperature of the raw material gas is not uniform throughout the stirring chamber 54. This is an indication that the raw material gas and the air are not uniformly mixed. Therefore, in the fuel reformer 20 of the embodiment, a uniformly mixed gas of the reforming raw material and air is supplied to the reforming section 60 as the raw material gas.

Figure 9:
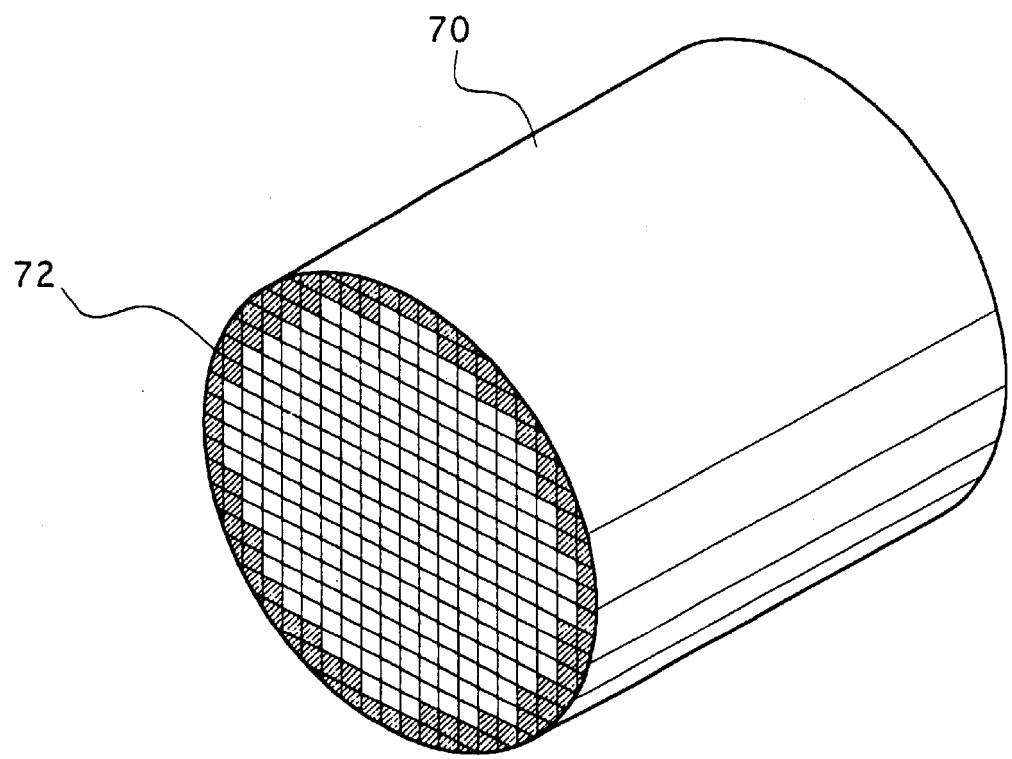
FIG. 9 is a perspective illustration of a monolithic catalyst 70.
Figure 10:
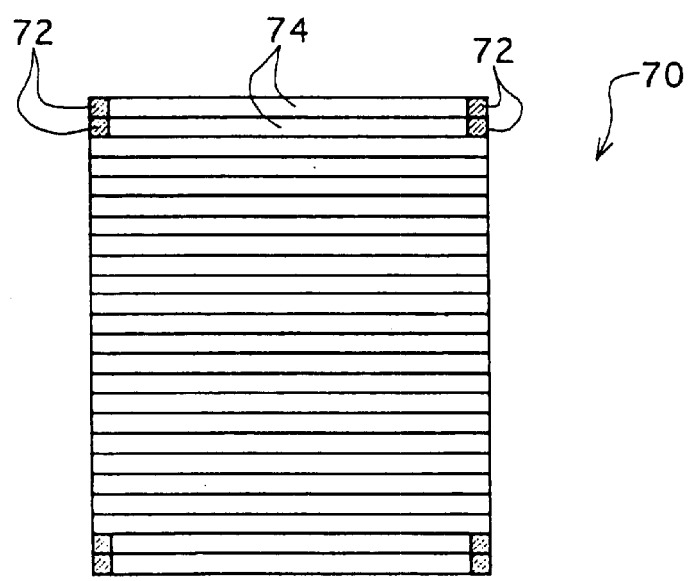
FIG. 10 is a cross sectional diagram of a monolithic catalyst 70 exemplifying the cross section along the gas flow within the monolithic catalyst 70.

As described above, the reforming section 60 is constructed from a reforming front side 62 and a reforming rear side 64, each having a plurality of monolithic catalysts 70, interconnected by an interconnecting pipe 66. FIG. 9 shows one example of a monolithic catalyst 70 and FIG. 10 shows a cross section of the monolithic catalyst 70 along the gas flow. As shown in the figures, the monolithic catalyst 70 is constructed by carrying a reforming catalyst such as a copper-zinc catalyst on a ceramics monolith carrier of cylindrical shape with a plurality of cells (flow paths) having an entrance and an exit for the gas at the two ends of the cylinder. Both the entrances and exits of the cells that are positioned at the outer edge of the monolithic catalyst 70 are filled with ceramics filler member 72 to form an insulation layer 74. By forming an insulation layer 74 in this manner, cooling of the monolithic catalysts 70 due to the outside air can be prevented.

Referring back to FIG. 2, the front side 62 and rear side 64 of the reforming section 60 are provided with a plurality of monolithic catalysts 70. A plurality of monolithic catalysts are provided instead of one monolithic catalyst in order to disturb the gas flow at the boundaries between each of the monolithic catalysts 70. Due to the disturbed gas flow, the gas can flow uniformly into each of the cells of a monolithic catalyst 70 and contact between the unreacted methanol and water vapor and the catalyst can be promoted. Thus, in the fuel reformer 20 of the present embodiment, by providing a plurality of monolithic catalysts 70, the reforming efficiency can be improved.

In the reforming section 60, as can be seen from FIGS. 1 and 2, the raw material gas flows in a direction approximately orthogonal to the flow of the reforming raw material at the vaporization section 30, which is in a horizontal direction, for the reforming reaction. Thus, when mounting on a vehicle, especially on a small passenger car, the length of the catalyst layer can be extended, compared to an apparatus where the reforming reaction is performed, by making the material gas flow vertically and the length of contact time between the raw material gas and the catalyst can now be sufficiently long, allowing for an improved reforming efficiency. Moreover, because the cross sectional shape of the flow path of the raw material gas at the reforming section 60 (cross sectional shape of the monolithic catalysts 70) is circular, that is, because the front side 62 and the rear side 64 of the reforming section 60 have a cylindrical shape, the raw material gas can flow more uniformly and the reforming efficiency of the overall structure can be improved. Furthermore, by dividing the reforming section 60 into the front side 62 and the rear side 64 and bending them at 180 degrees, the size of the overall structure can be reduced and mounting in a limited space of a vehicle is facilitated.

As shown in FIG. 2, the reforming front side 62 of the reforming section 60 is provided with, near its gas entrance, two pressure adjusting plates 55 constructed from a porous material for making the flow rate of the raw material gas, which has been uniformly mixed by the swirl stirrer 52, uniform at each cross sectional position and a heater 58 for quickly heating the monolithic catalysts 70 at the time of start-up of the fuel reformer 20. The heater 58 carries catalysts such as a copper-zinc catalyst for heating the raw material gas using the partial oxidation reaction of methanol represented by equation 2.

Figure 11:
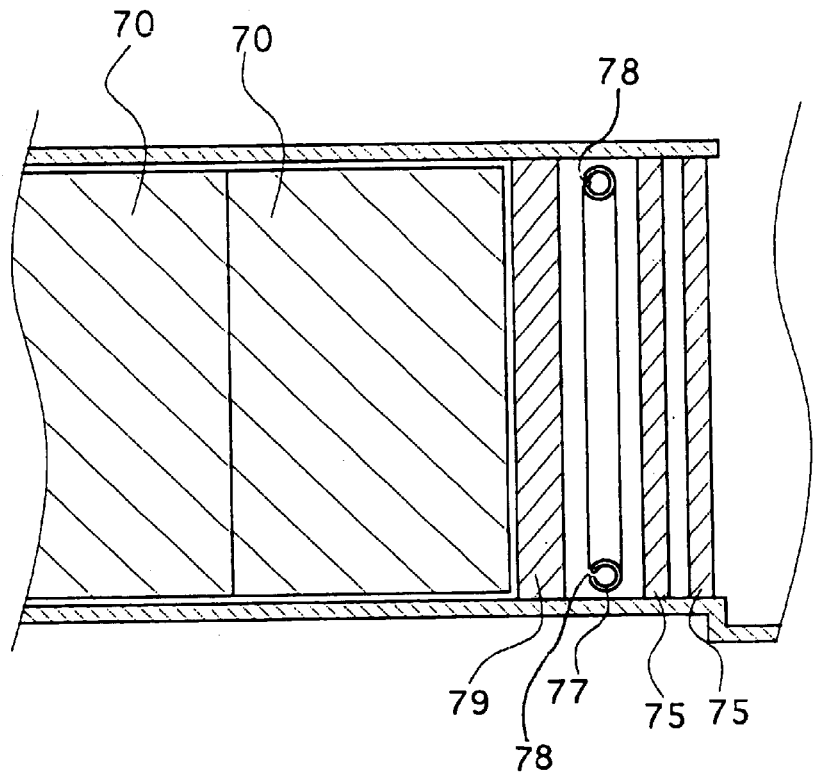
FIG. 11 is an enlarged diagram showing the area around the gas entrance of a rear side 64 of the reforming section.
Figure 12:
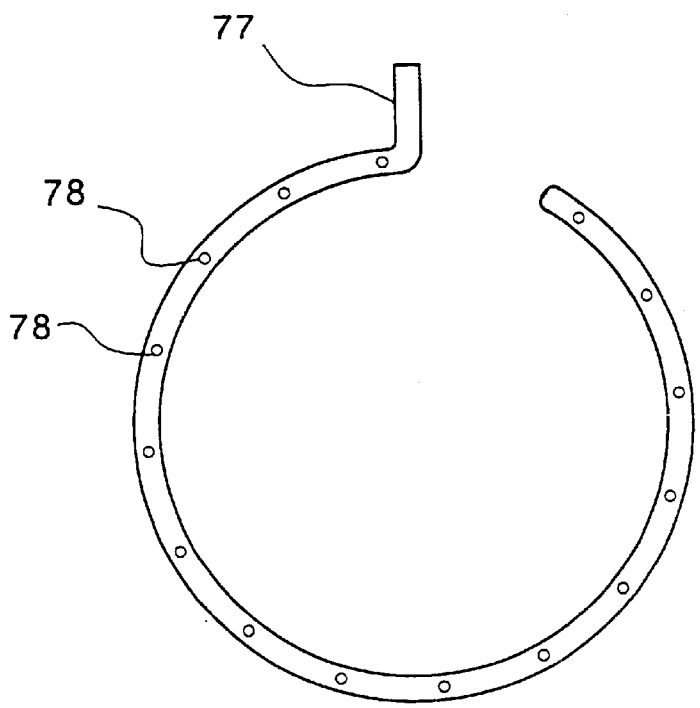
FIG. 12 is a figure showing one example of an air supply pipe 77.

The reforming rear side 64 of the reforming section 60 is also provided, near its gas entrance, with two pressure adjusting plates 75 constructed from a porous material for making the flow rate of the gas uniform at each cross sectional position. Behind the pressure adjusting plates 75, the rear side 64 is provided with an air supply pipe 77 formed as a ring-shaped pipe for supplying air acting as oxygen-containing gas to the outer edge of the gas supplied to the reforming rear side 64, and a heater 79 identical to the heater 58. FIG. 11 shows an enlarged view of the reforming rear side 64 around its gas entrance and FIG. 12 shows one example of the air supply pipe 77. As shown in the figure, a plurality of small holes 78 are provided in the air supply pipe 77 to act as the blow-out point for air. Thus, when air is supplied from the air supply pipe 77 while simultaneously operating the heater 79, the unreacted methanol located at the outer edge within the gas supplied to the reforming rear side 64 is oxidized by a partial oxidation reaction represented by equation 2 on the catalyst of the heater 79 with generation of heat. Because the reforming reaction represented by equation 1 is an endothermic reaction and requires heat for smoothly advancing the reforming reaction and because the outer edge is affected by the outside air the most within the monolithic catalyst 70 and must be prevented from cooling, the partial oxidation is performed at the outer edge of the entrance of the is reforming rear side 64.

The interconnecting pipe 66 of the reforming section 60 has a double layered structure, as shown in FIG. 2 and is provided with an insulation layer 66*a* constructed from an insulator such as air. By providing this insulation layer 66*a* to the interconnecting pipe 66, heat can be prevented from flowing out from the interconnecting pipe 66 to the outside and thus, the reforming efficiency can be improved.

Figure 13:
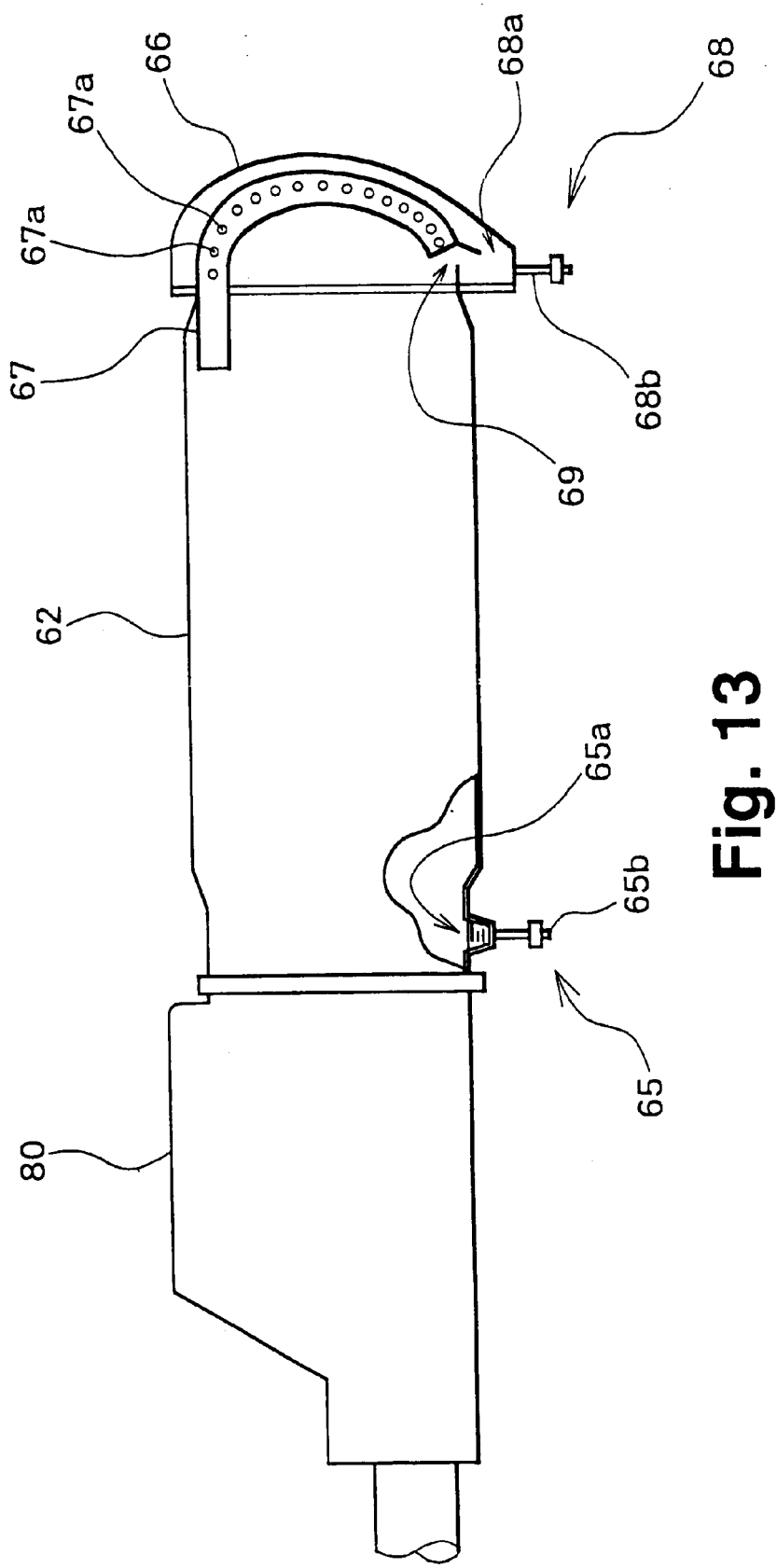
FIG. 13 is a diagram showing the cross section and side view of a fuel reformer 20 shown in FIG. 2, cut in A—A surface.
Figure 14:
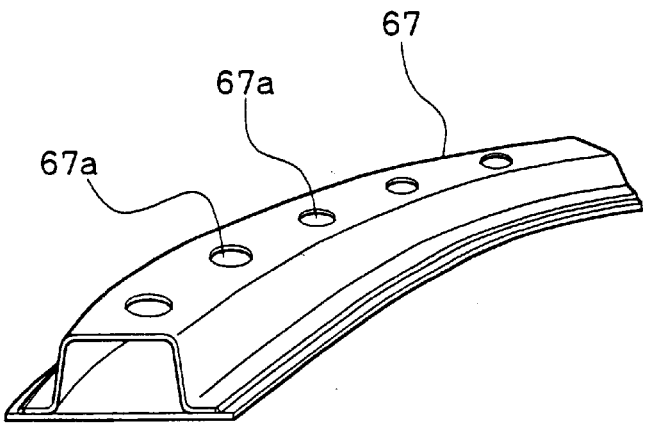
FIG. 14 is a diagram showing a portion of an air supply pipe 67.
Figure 15:
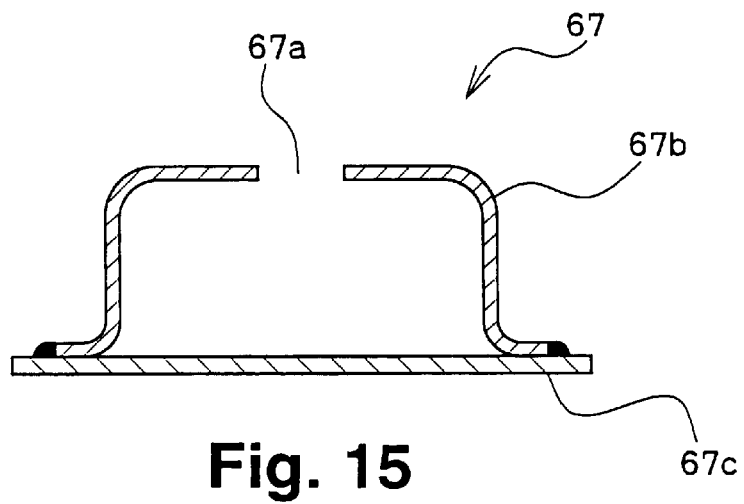
FIG. 15 is a cross sectional diagram showing a cross section of an air supply pipe 67.
Figure 16:
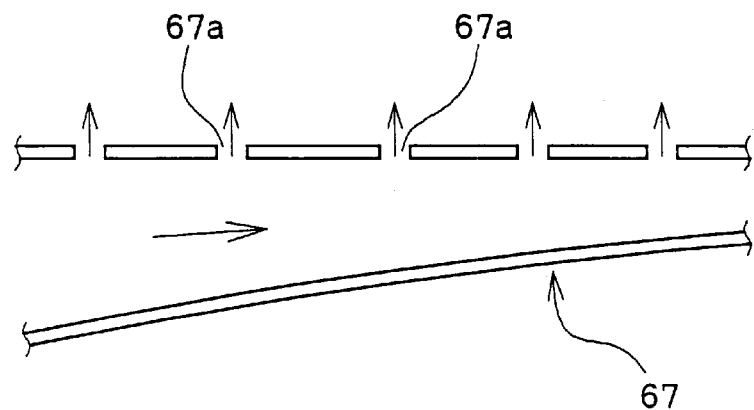
FIG. 16 is a cross sectional diagram of an air supply pipe 67 along the gas flow schematically showing injection from nozzles 67*a*.
Figure 17:
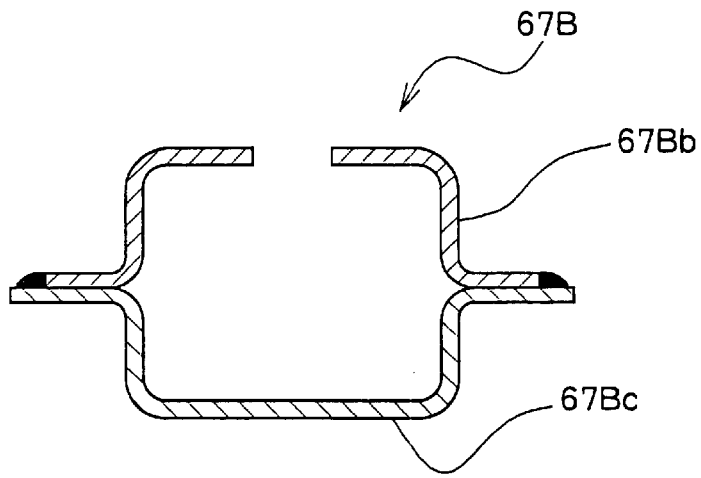
FIG. 17 is a cross sectional diagram exemplifying an air supply pipe 67B of an alternate embodiment.
Figure 18:
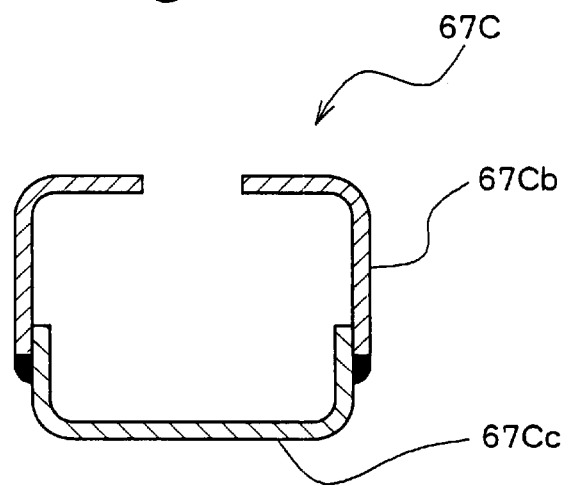
FIG. 18 is a cross sectional diagram exemplifying an air supply pipe 67C of another alternate embodiment.
Figure 19:
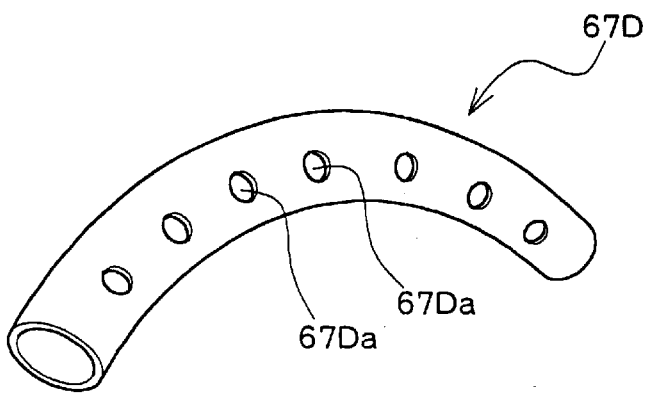
FIG. 19 is a diagram showing an air supply pipe 67D of an alternate embodiment.

FIG. 13 shows a cross section of the fuel reformer 20 shown in FIG. 2 along the A—A surface showing a side view of the fuel reformer 20. As shown in FIGS. 2 and 13, a U-shaped air supply pipe 67 is provided in a vertical direction contacting the inner wall of the interconnecting pipe 66 of the reforming section 60 for supplying air acting as oxygen-containing gas to the interconnecting pipe 66. Nozzles 67*a* of the air supply pipe 67 are provided so as to be approximately 180 degrees with respect to the gas flow in the interconnecting pipe 66, that is, in the opposite direction to the gas flow. By supplying air from the nozzles 67*a*, the gas flow in the interconnecting pipe 66 is disturbed and air is mixed with the gas. FIG. 14 shows a portion of the air supply pipe 67 and FIG. 15 shows a cross sectional structure of the air supply pipe 67. As shown in FIG. 15, the air supply pipe 67 has a hollow structure constructed by arc welding an upper 67*b* and a lower 67*c*, the upper 67*b* having a plurality of nozzles 67*a* formed by pressing stainless material. FIG. 16 shows the cross section of the air supply pipe 67 along the air flow and the structure of the nozzles 67*a*. The air supply pipe 67 has its cross section varied, from a larger cross section at the upstream to a smaller cross section at the downstream of the air flow. This variation in cross section is for injecting air uniformly from the plurality of nozzles 67*a*. The change rate of the cross section is determined from resistance within the air supply pipe 67, the pressure of supplied air, and positions and size of the nozzles 67*a*, etc. With such an air supply pipe 67, air can be uniformly supplied and the mixture of the gas and air within the interconnecting pipe 67 can be made more uniform. The air supply pipe 67 is provided to contact the inner wall of the interconnecting pipe 66 in order to prevent the gas which changes its direction by 180 degrees within the interconnecting pipe 66 from flowing only on the outer edge. For this purpose, the interconnecting pipe 66 can be provided with a pipe holding member at its inner wall to hold the air supply pipe 67. In the fuel reformer 20 according to the present embodiment, air is supplied from this air supply pipe 67 at the time of start-up and when the temperature of the reforming rear side 64 is low. By introducing air from this air supply pipe 67, the temperatures at the reforming front side 62 and rear side 64 can be quickly increased, avoiding a disadvantage where the temperature of the front side 62 is increased but that of the rear side 64 is not. In the embodiment, the air supply pipe 67 has a cross section exemplified in FIG. 15, but other shapes are also possible, including an air supply pipe 67B of an alternate embodiment shown in FIG. 17 in which the air supply pipe has a hollow structure formed by arc welding an upper 67B*b* and a lower 67B*c*, an air supply pipe 67C shown in FIG. 18 in which the air supply pipe has a hollow structure formed by arc welding an upper 67C*b* and a lower 67C*c*, and an air supply pipe shown in FIG. 19 which has a pipe structure.

Figure 20:
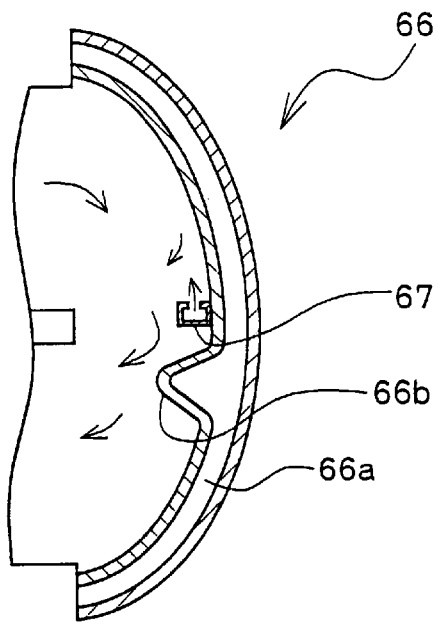
FIG. 20 is a diagram exemplifying gas flow within an interconnecting pipe 66.

As shown in FIG. 2, a flow direction adjusting member 66*b* is provided at the inner wall of the interconnecting pipe 66 for adjusting the gas flow direction within the interconnecting pipe 66. This flow direction adjusting member 66*b* is formed as a channel by pressing, concave to the inside and convex to the outside, when the inner wall of the interconnecting pipe 66 is constructed. FIG. 20 exemplifies gas flow within the interconnecting pipe 66. Normally, a large portion of the gas flowing from the reforming front side 62 to the interconnecting pipe 66 flows around the outer edge due to the change of the flow direction by 180, degrees at the interconnecting pipe 66. However, by providing a flow direction adjusting member 66*b* at the inner wall of the interconnecting pipe 66, the gas flow direction is altered. As a result, depending on the degree of change of the gas flow direction, the gas flows uniformly to the reforming rear side 64. In the present embodiment, the shape and size of the flow direction adjusting member 66*b* are determined by experiments so that the gas flows uniformly to the reforming rear side 64. In the present embodiment, a flow direction adjusting member 66*b* is provided, but when the air supply pipe 67 can play a similar role, the reformer can be configured without the flow direction adjusting member 66*b*. In the present embodiment, the flow direction adjusting member 66*b* is provided at low cost by pressing in the inner wall of the interconnecting pipe 66, but it can also be provided by welding and placing a separate member other than the inner wall of the interconnecting pipe 66, such as a fin-shaped member.

Figure 21:
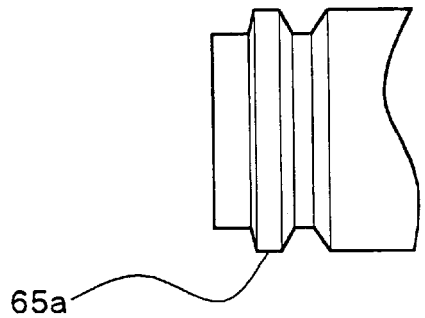
FIG. 21 is a diagram showing one example of a channel 65*a*.
Figure 22:
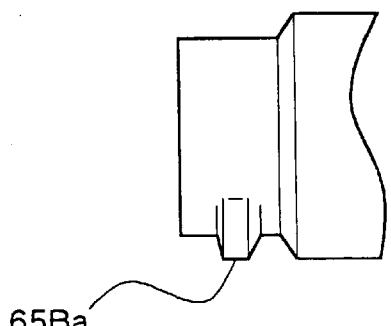
FIG. 22 is a diagram showing a channel 65B*a* of an alternate embodiment.

As shown in FIG. 13, the reforming section 60 is provided with a liquid collecting section 65 near the flow entrance of the vaporized reforming raw material. The liquid collecting section 65 comprises a concave channel 65*a* and a drain 65*b* for discharging the liquid accumulated at the channel 65*a* at the lower portion in the vertical direction of the reforming section 60. The channel 65*a* is constructed by reducing the portion around the gas entrance in a convex shape toward inside when the entrance is reduced by spinning after the monolithic catalysts 70 are inserted in the reforming section 60. FIG. 21 shows one example of the channel 65a. By constructing the channel 65a by spinning and integrating it with the inner wall of the reforming section 60, welding etc. is no longer necessary and the number of components can be reduced. In the present embodiment, the channel 65a is formed by spinning around the entire circumference of the pipe, but it is also possible to form the channel 65a in only a portion of the circumference as shown by a channel 65Ba in an alternate embodiment illustrated in FIG. 22. The processing of the channel is not limited to spinning, and can also be performed by pressing. It is also possible to form the channel 65a from a separate member. The reforming section 60, as shown in FIG. 13, also includes a liquid collecting section 68 at the interconnecting pipe 66 also. The liquid collecting section 68 is constructed as a part of the double pipe structure of the interconnecting pipe 66, and comprises a liquid pool 68a provided at the outer wall and a drain 68b for discharging the liquid accumulated at the liquid pool 68a. A plurality of penetrating holes 69 are provided near the liquid pool 68a at the lower portion of the inner wall forming the double pipe structure, and the reforming raw material etc. liquefied within the interconnecting pipe 66 is accumulated at the liquid pool 68a through the penetrating holes 69. In this manner, by providing a liquid collecting sections 65 and 68, even when a portion of the raw material gas is liquefied, the liquid can be accumulated at the channel 65a of the liquid collecting section 65 or at the liquid pool 68a of the liquid collecting section 68, and degradation of the monolithic catalysts 70 filling the reforming front 62 and rear 64 sides and of the performance of the monolithic catalysts 70 due to liquefied reforming raw material (methanol and water) can be prevented.

Figure 23:
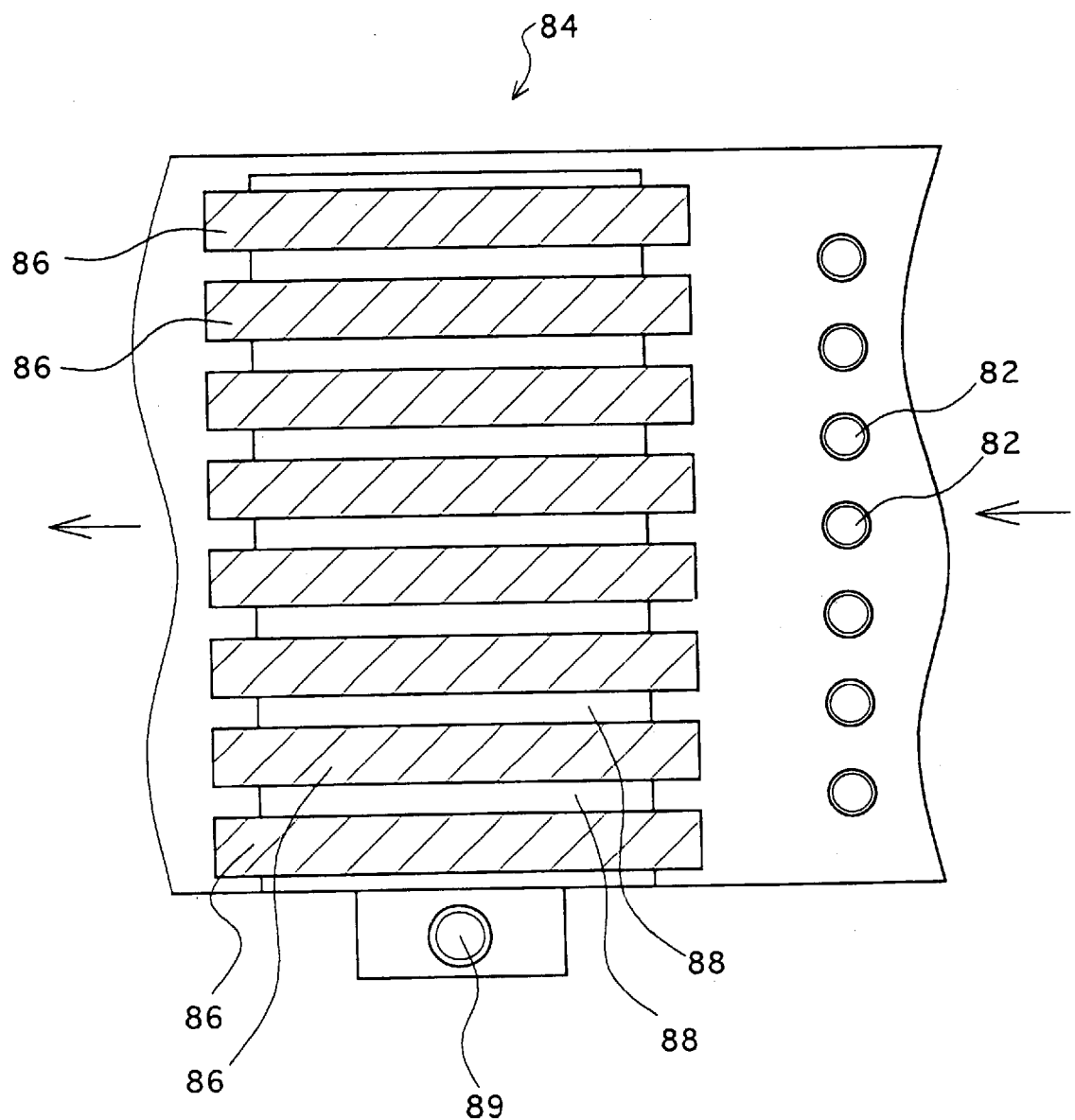
FIG. 23 is a cross sectional diagram showing structure in a horizontal cross section of a pair of an air supply pipe 82 and a catalyst heat exchanger 84.

The CO reducing section 80 is formed by providing a plurality of pairs of an air supply pipe 82 and a catalyst heat exchanger 84. The air supply pipe 82 supplies air as an oxygen-containing gas to the reformed gas reformed at the reforming section 60. The catalyst heat exchanger 84 carries a selecting oxidation catalyst for oxidizing carbon monoxide in the presence of oxygen with a higher priority than the oxidation of hydrogen, such as platinum and ruthenium catalysts and heats the liquid reforming raw material which is to be supplied to the vaporization section 30 using the heat generated by the oxidation of carbon monoxide. FIG. 23 is a cross sectional diagram showing a detailed structure in a horizontal direction of a pair of the air supply pipe 82 and a catalyst heat exchanger 84. As shown, the catalyst heat exchanger 84 is constructed by alternately layering a catalyst layer 86 and a reforming raw material flow path 88. The catalyst layer 86 carries a selecting oxidation catalyst and makes reformed gas flow from the right to the left in a horizontal direction for oxidizing carbon monoxide within the reformed gas. The reforming raw material flow path 88 makes the reforming raw material flow vertically from the bottom to the top, namely from the back of the figure to the front. Thus, the reforming raw material and the reformed gas flow perpendicular to each other for exchanging heat. Because of this, the shape of the CO reducing section 80 is preferably an approximate rectangular prism. FIG. 23 also shows a reforming raw material supply pipe 89 for supplying reforming raw material to the reforming raw material flow path 88.

As shown in FIG. 2, the fuel reformer 20 of the embodiment has a reforming section 60 as a U-turned structure, with the vaporization section 30 and CO reducing section 80 adjacent to each other. The fuel reformer is configured in this way to heat the reforming raw material at the CO reducing section 80 using heat generated by oxidation of carbon monoxide and then supplying the reforming raw material to the vaporization section 30 without heat loss. By placing each section in this manner, the fuel reformer 20 of the present embodiment can reduce the radiating area to the outside, use the heat more efficiently, and improve the overall energy efficiency of the apparatus.

As shown in FIGS. 1 and 2, in the fuel reformer 20 of the embodiment, the CO reducing section 80 is provided with an ignition plug 83 downstream of a first air supply pipe 82. The ignition plug 83 is used at the time of start-up in a very low temperature. In other words, the ignition plug 83 is used to quickly increase the temperature of the selecting oxidation catalyst to its activation temperature using heat obtained by combusting hydrogen within the reformed gas. As a result, the time required for the start-up can be shortened and the carbon monoxide concentration of the fuel gas can be sufficiently reduced even in the time period immediately following the startup.

Figure 24:
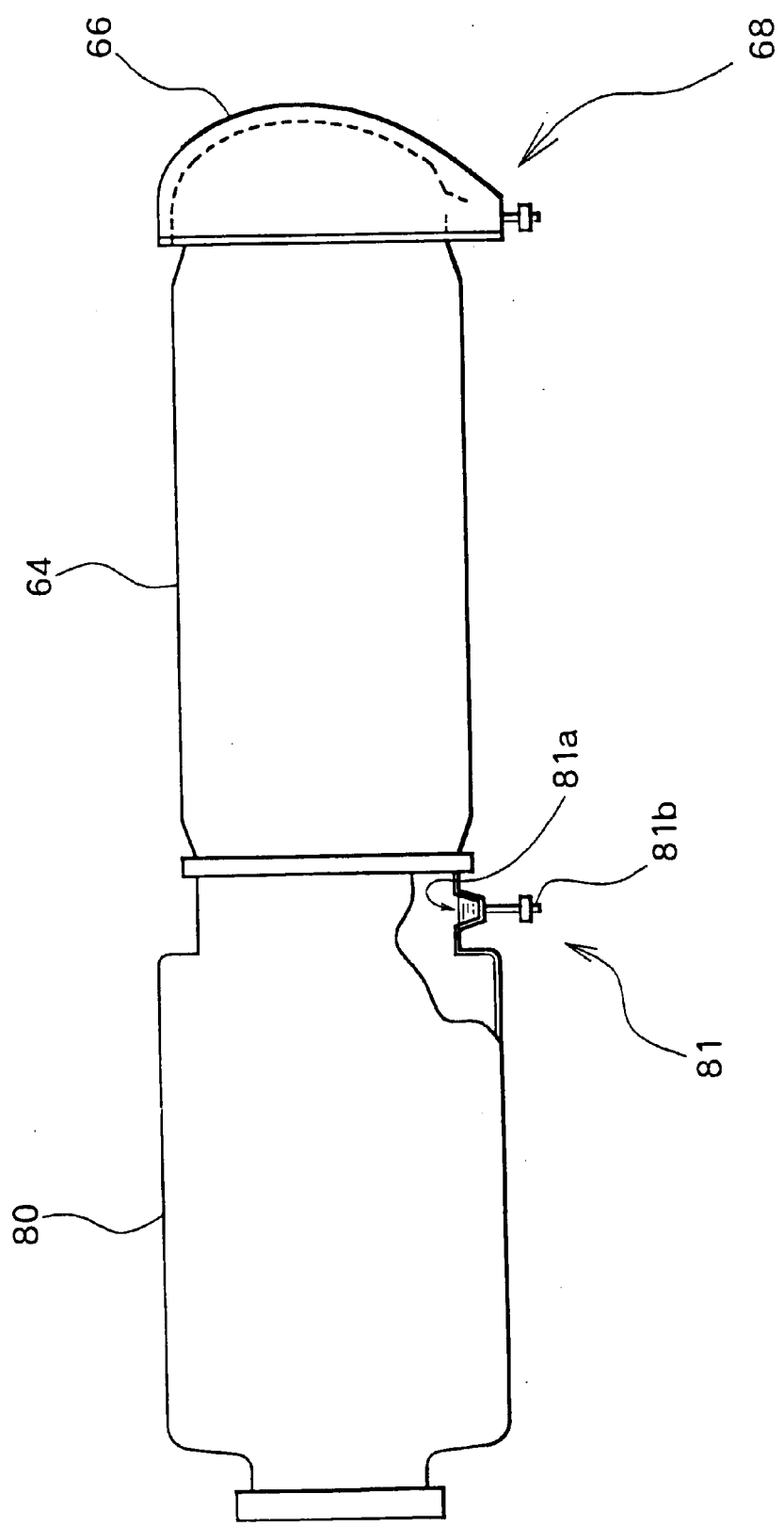
FIG. 24 is a side view of a fuel reformer 20 at the B—B surface shown in FIG. 2.

FIG. 24 is a side view of the fuel reformer 20 at the B—B surface shown in FIG. 2. As shown, the CO reducing section 80 is provided with a liquid collecting section 81 near the entrance of the reformed gas, reformed at the reforming section 60. The liquid collecting section 81 has a similar structure to that of the liquid collecting section 65 provided at the reforming section 60, and comprises a concave channel 81a at the lower portion of the inner wall of the CO reducing section 80 for acting as a liquid pool and a drain 81b for discharging the liquid accumulated at the channel 81a. In the fuel reformer 20 of the embodiment, by providing such a liquid collecting section 81, even when a portion of unreacted raw material gas flows in with the reformed gas and is liquefied, the liquid can be accumulated at the channel 81a of the liquid collecting section 81, and degradation in the selecting oxidation catalyst in the CO reducing section 80 and in the performance of the catalyst heat exchanger 84 due to liquefied reforming raw material (methanol and water) can be prevented.

Figure 25:
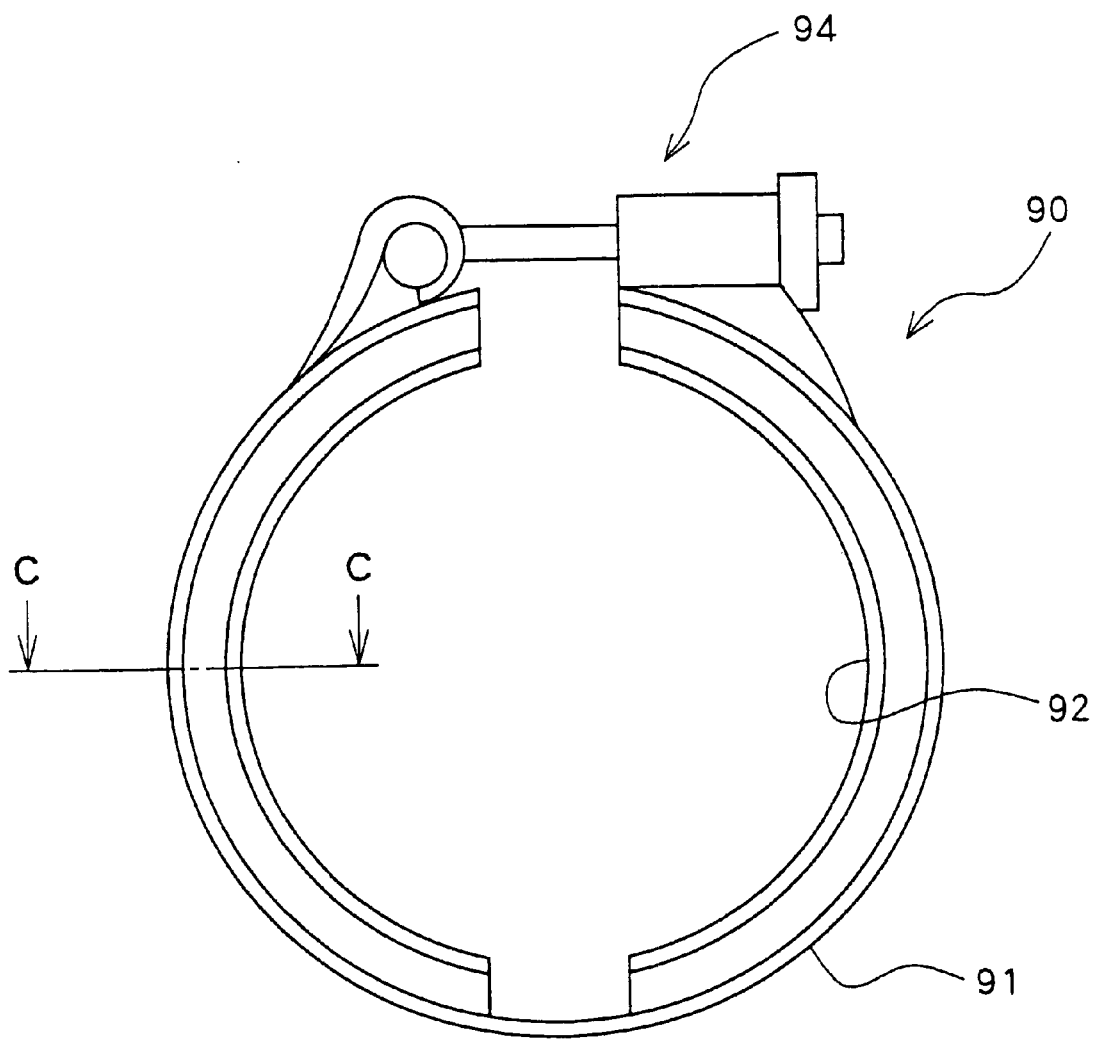
FIG. 25 is a structural diagram showing a structure of a V-shaped band 90.
Figure 26:
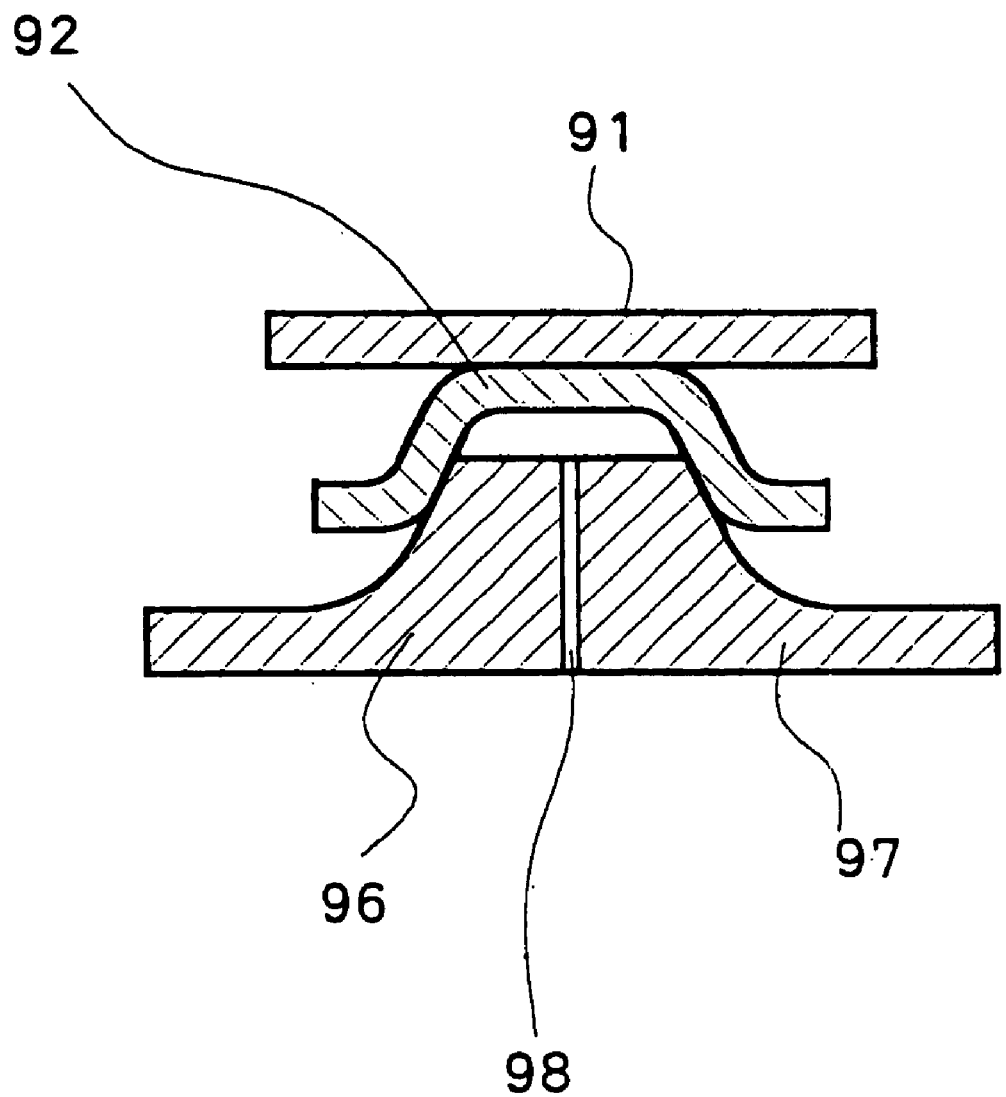
FIG. 26 is a cross sectional diagram showing a V-shaped band 90 at the C—C surface shown in FIG. 25 when the V-shaped band is fastened.

In the fuel reformer 20 of the embodiment, the vaporization section 30, reforming section 60, and co reducing section 80 are each provided as a separate unit, and each of the unitized sections can be easily connected or disconnected. As a result, maintenance of each of the sections can be simplified. Needless to say, this ease in maintenance is advantageous for mounting the apparatus on a vehicle. In the fuel reformer 20 of the embodiment, connections between each of the sections, that is, the connections between the vaporization section 30 and reforming section 60 and between the reforming section 60 and the CO reducing section 80, are provided by fastening flanges formed at the ends of each section by a V-shaped band 90. FIG. 25 schematically shows such a V-shaped band and FIG. 26 shows a C—C cross section of FIG. 25 when the sections are fastened using the V-shaped band. As shown in FIG. 25, the V-shaped band 90 comprises a ring-shaped closing band 91 formed from a metal material (such as stainless metal), a V-shaped tapping band 92 also formed from a metal material (such as stainless metal) at the interior to the closing band 91, and a closing piece 94 located at the opening end (FIG. 25, upper middle part) of the closing band 91. The radius of the closing band 91 can be altered by operating on the closing piece 94. As shown in FIG. 26, fastening using the V-shaped band 90 is performed by pinching a packing 98 for retaining sealing between flanges 96 and 97 formed at the end of each section, placing the V-shaped band 90 so that the tapping band 92 having an approximate V-shape pinches both flanges 96 and 97 and the flanges are tapped toward the center, and operating the closing piece 94 so that the closing band 91 is closed from the outside. In this fastening structure using the V-shaped band 90, because fastening can be performed by operating the closing piece 94 only, each section can be easily connected and disconnected. Moreover, a uniform surface pressure and sufficient sealing can be retained. Furthermore, because a V-shaped band 90 has a small heat capacity in general, heat loss can be reduced.

Figure 27:
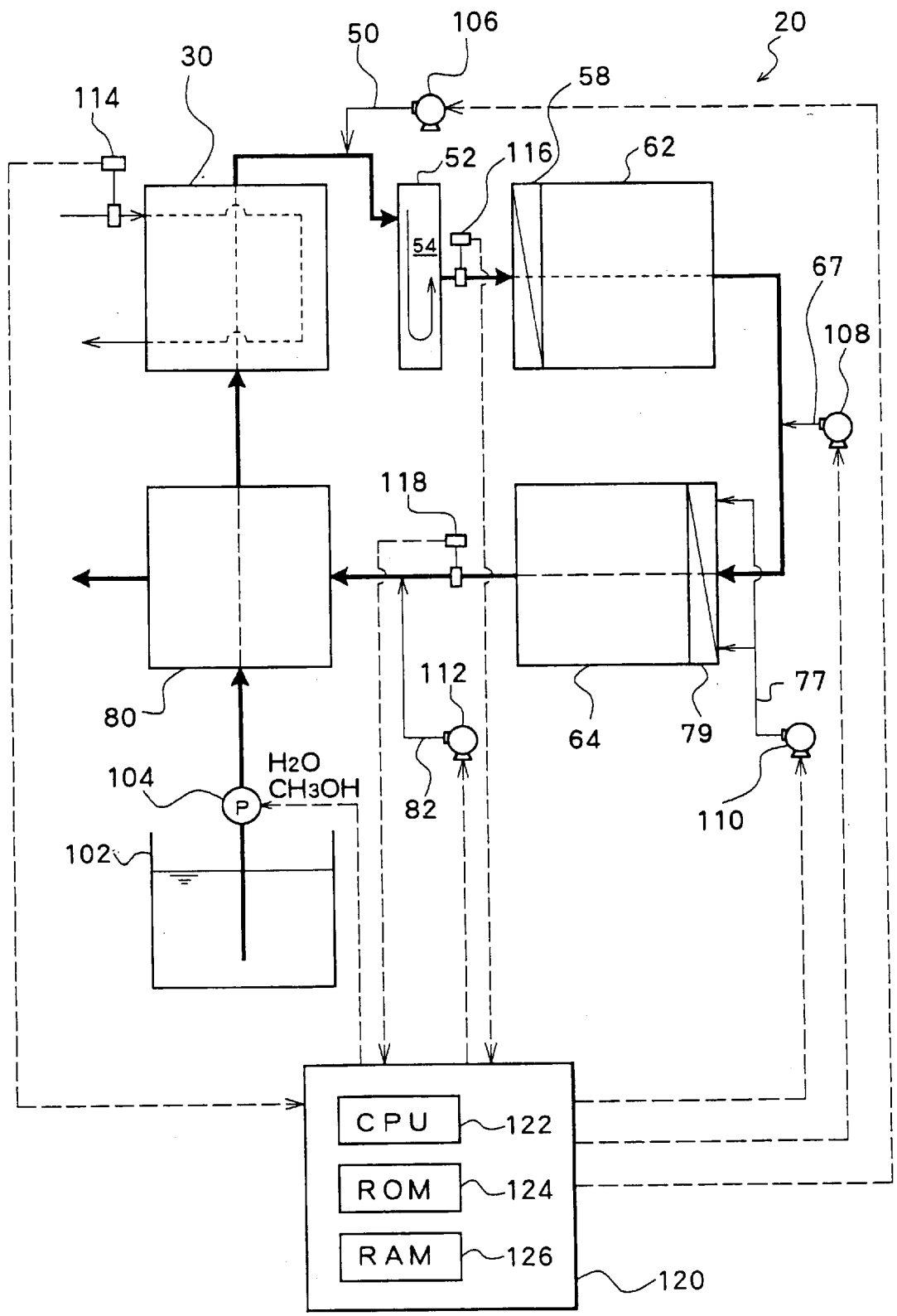
FIG. 27 is a structural diagram schematically showing structures provided when the fuel reformer 20 of the present invention performs a temperature management.

The operation of the fuel reformer 20 thus constructed, especially the operation in temperature management, is described hereinafter. FIG. 27 schematically shows the structure included in the fuel reformer 20 when temperature management is performed. As shown in the figure, the fuel reformer 20 comprises an electric control unit 120 for controlling the entire device. The electric control unit 120 is configured as a microprocessor having a CPU 122 at its core, and includes a ROM 124 for storing the processing programs, a RAM 126 for temporarily storing data, and input/output ports (not shown). The electric control unit 120 is provided with temperature T1 of the fuel gas from a temperature sensor 114 placed at the entrance of the heat exchange flow path 40 of the vaporization section 30, temperature T2 of the raw material gas from a temperature sensor 116 placed at the entrance of the raw material gas of the reforming section 60, and temperature T3 of the reformed gas from a temperature sensor 118 placed at the exit of the reforming section 60 as inputs through the input ports. The electric control unit 120 outputs, through the output ports, driving signals to a pump 104 for supplying reforming raw material from a reforming raw material tank 102 to the CO reducing section 80 and to blowers 106, 108, 110, and 112 for supplying air to the air supply pipes 50, 67, 77, and 82, respectively.

Figure 28:
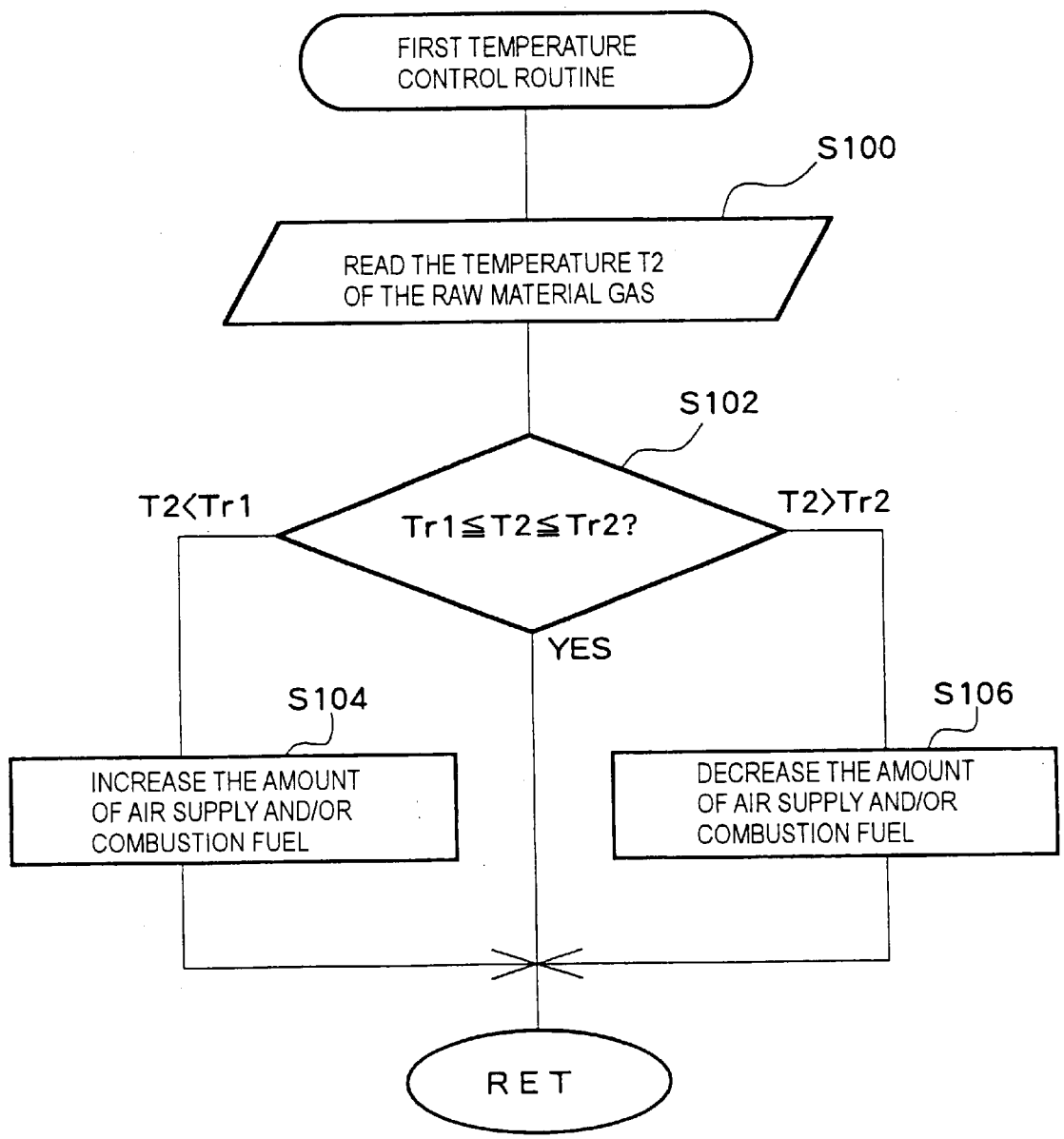
FIG. 28 is a flowchart showing one exemplified routine of a first temperature control performed by an electric control unit 120 of the fuel reformer 20.

In the fuel reformer 20, the supplied amounts of air from the air supply pipe 50 and of the combustion fuel to the vaporization section 30 are controlled according to the temperature of the raw material gas detected by the temperature sensor 116 placed on the entrance of the raw material gas of the reforming section 60. This control is performed by, for example, a first temperature control routine exemplified in FIG. 28. In this example of a first temperature control routine, the temperature T2 of the raw material gas detected by the temperature sensor 116 is read (step S100) and when the temperature T2 is outside a temperature range defined by threshold values Tr1 and Tr2 (step S102), the amount of air supplied by the air supply pipe 50 and/or amount of combustion fuel supplied to the vaporization section 30 are changed (steps S104 and S106) so that the temperature T2 of the raw material gas is controlled to fall within the temperature range defined by the threshold values Tr1 and Tr2. The threshold values Tr1 and Tr2 are lower and upper limit values around a target temperature within a temperature range in which the reforming reactions represented by equations 1 and 2 can be smoothly performed, that is, in a temperature range in which the catalyst carried on the monolithic catalysts 70 can be effectively activated and the catalyst does not degrade. When copper-zinc catalysts are used as a catalyst, for example, these threshold values are set within a temperature range between 250° C. and 300° C., where the catalyst can be effectively activated and does not degrade. The changes to the amounts of air supplied by air supply pipe 50 and of the combustion fuel supplied to the vaporization section 30 are performed by changing the supply pressure and speed of rotation of the blower 106 and the discharge pressure and speed of rotation of the pump.

Figure 29:
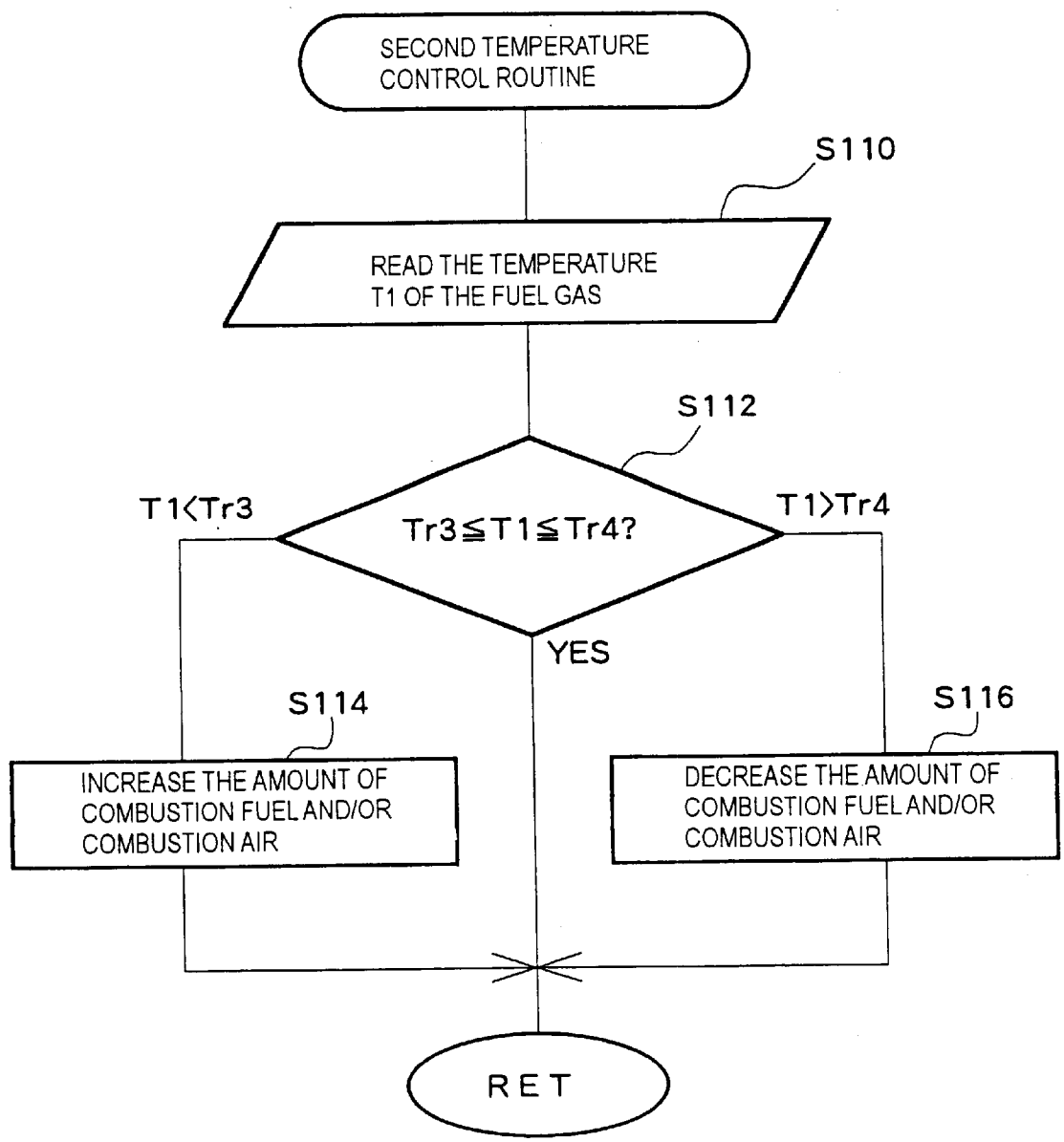
FIG. 29 is a flowchart showing one exemplified routine of a second temperature control performed by an electric control unit 120 of the fuel reformer 20.

In the fuel reformer 20 of the present embodiment, the amounts of combustion fuel and of combustion air supplied to the vaporization section 30 are controlled based on the temperature T1 of the combustion fuel gas detected by the temperature sensor 114 placed on the entrance of the heat exchange flow path 40 of the vaporization section 30. This control is performed by a second temperature control routine, such as shown in FIG. 29. In this exemplified second temperature control routine, the temperature T1 of the combustion fuel gas detected by the temperature sensor 114 is read (step S110) and when the temperature T1 is outside a temperature range defined by threshold values Tr3 and Tr4 (step S112), the amounts of combustion fuel supplied to the vaporization section 30 and of air for combusting this fuel are changed (steps S114 and S116) so that the temperature T1 of the fuel gas falls within a set range defined by the threshold values Tr3 and Tr4. The threshold values Tr3 and Tr4 are the lower and upper limit values around a target temperature within a temperature range set for the combustion fuel gas when the fuel reformer 20 is constantly operated. The target temperature set for the fuel gas changes according to several factors, including the operational condition of the fuel reformer 20. The changes to the amounts of the combustion fuel supplied to the vaporization section 30 and of air for combusting this fuel are performed by changing discharge pressure and speed of rotation of a pump (not shown) and supply pressure and speed of rotation of a supply blower (also not shown) for the combustion air.

Figure 30:
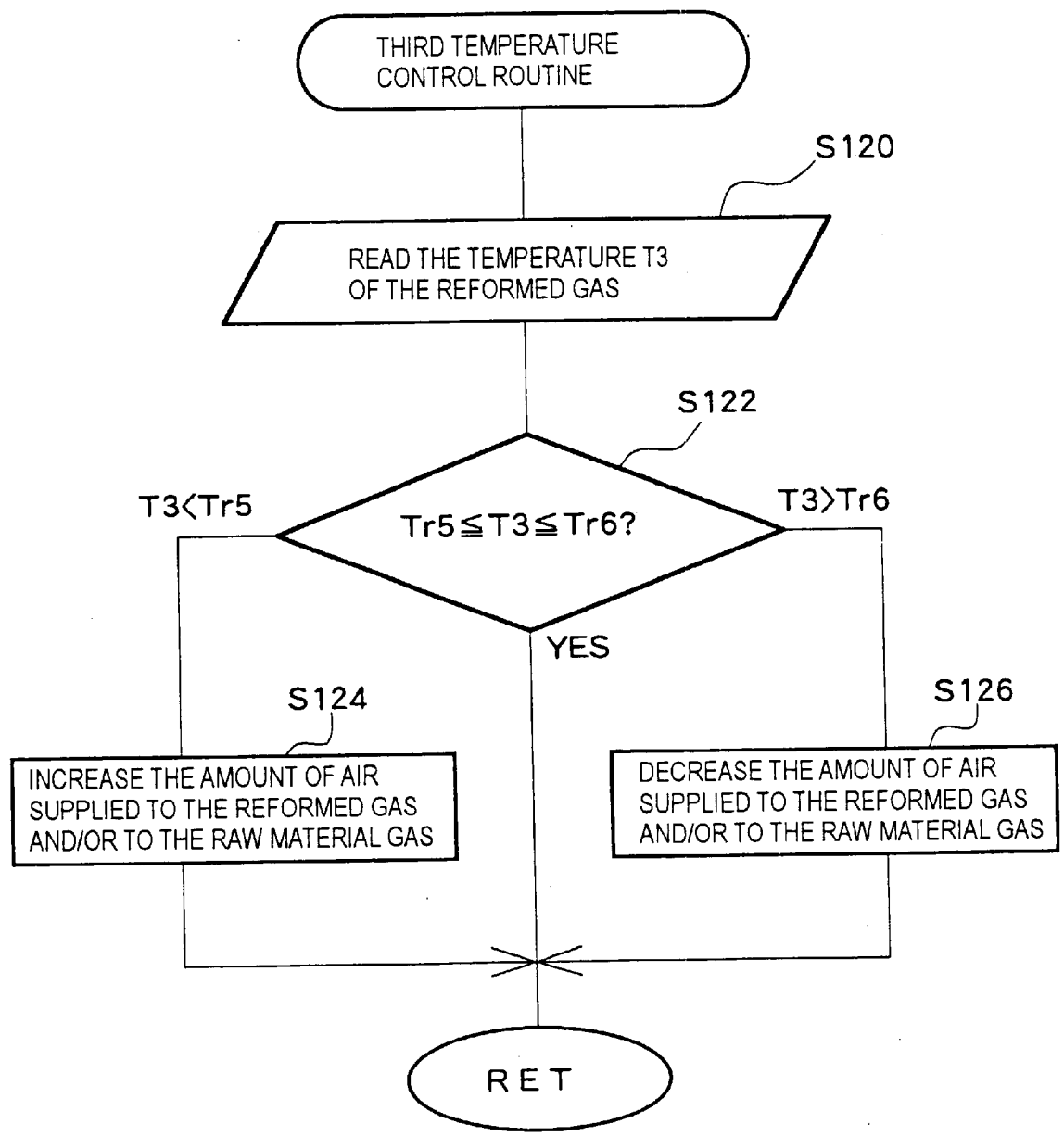
FIG. 30 is a flowchart showing one exemplified routine of a third temperature control performed by an electric control unit 120 of the fuel reformer 20.

In the fuel reformer 20 of the present embodiment, the amounts of air supplied to the reformed gas from the air supply pipe 82 and of the air supplied to the raw material gas from the air supply pipe 50 are controlled based on the temperature T3 of the reformed gas detected by the temperature sensor 118 placed at the exit of the reforming section 60. This control is performed by a third temperature control routine such as the one exemplified in FIG. 30. In the third temperature control routine, the temperature T3 of the reformed gas detected by the temperature sensor 118 is read (step S120) and when the temperature T3 is outside a temperature range defined by threshold values Tr5 and Tr6 (step S122), the amounts of air supplied to the reformed gas from the air supply pipe 82 and of the air supplied to the raw material gas from the air supply pipe 50 are changed (steps S124 and S126) so that the temperature T3 of the reformed gas falls within a temperature range defined by the threshold values Tr5 and Tr6. The threshold values Tr5 and Tr6 are the lower and upper limit values around a target temperature within a temperature range where the selecting oxidation catalyst for oxidizing carbon monoxide with higher priority than hydrogen in the presence of oxygen can be effectively activated. For example, when platinum or ruthenium is used as a selecting oxidation catalyst, the temperature is set between 100° C. and 130° C. where the catalyst can be effectively activated. The changes to the amounts of the air supplied to the reformed gas by the air supply pipe 82 and of the air supplied to the raw material gas by the air supply pipe 50 are performed by changing the supply pressure and speed of rotation of the blower 112 and supply pressure and speed of rotation of the blower 106.

As explained above, according to the present invention, the fuel reformer 20 for mounting on a vehicle can be constructed to be suited for mounting on a vehicle. In other words, by making the gas flow in horizontal direction at the reformer section 60 and the CO reducing section 80, even when the reformer is mounted on a vehicle having more space in horizontal direction than in the vertical direction, especially a small passenger car, the length of the catalyst layer can be elongated and the contact time between the gas and the catalyst can be made sufficiently long, improving the reforming efficiency and the carbon monoxide reduction efficiency. Also, by providing the reforming section 60 by dividing it into a front side 62 and a rear side 64, bent at 180, degrees, the reformer can be constructed to have a small size and be suited for mounting in a limited space of a vehicle. Moreover, by placing the vaporization section 30 and the CO reducing section 80 adjacent to each other and supplying the reforming raw material heated at the CO reducing section 80 to the vaporization section 30, the energy efficiency of the device can be improved and the device can have a small size and be simplified. By providing the vaporization section 30, reforming section 60, and the CO reducing section 80 as separate units and fastening these units by a V-shaped band structure, the ease of maintenance can be improved, resulting in an apparatus suited for mounting on a vehicle. By shaping the reforming section into a cylindrical shape and providing a plurality of monolithic catalysts 70, the reforming efficiency can be improved, resulting in a compact device suited for mounting on a vehicle.

According to the fuel reformer 20 of the embodiment, because a heater 58 is placed at the entrance of the reforming section 60, the temperature of the monolithic catalyst 70 can be quickly changed to a suitable temperature at the time of start-up, which improves the start-up performance. By supplying air to the outer edge near the entrance of the reforming rear side 64 of the reforming section 60 using the air supply pipe 77 and by heating the outer edge by the heater 79, heat required for the reforming reaction at the rear side 64 can be supplied and the temperature of the rear side 64 can be maintained at a temperature where the catalyst is activated. As a result, reforming efficiency can be improved. By using a swirl stirrer 52, vaporized reforming raw material and air can be uniformly mixed without further energy supply from outside of the system.

According to the fuel reformer 20 of the present invention, by providing liquid collecting sections 65, 68, and 81 at the entrance of the raw material gas of the reforming front side 62, interconnecting pipe 66, and entrance of the reformed gas of the CO reducing section 80, respectively, and by collecting liquids when unreacted reforming raw material contained in the raw material gas or in the reformed gas is liquefied, degradations of the monolithic catalyst 70 in the reforming section 60 and of the selecting oxidation catalyst in the CO reducing section 80 can be prevented as well as degradation in performance of these catalysts.

According to the fuel reformer 20 of the present invention, because an air supply pipe 67 is provided at the interconnecting pipe 66 for supplying air, the temperatures of the front 62 and the rear 64 sides of the reforming section 60 can be quickly increased upon start-up. Moreover, by placing the air supply pipe 67 contacting the inner wall of the outer side of the interconnecting pipe 66, uneven distribution of the gas flowing through the interconnecting pipe 66 can be prevented and the gas can flow more uniformly.

According to the fuel reformer 20 of the present invention, the amounts of air supplied from the air supply pipe 50 and of the combustion fuel supplied to the vaporization section 30 can be controlled based on the temperature T2 of the raw material gas. The amounts of the combustion fuel supplied to the vaporization section 30 and of the combustion air can be controlled based on the temperature T1 of the fuel gas. The amounts of air supplied from the air supply pipe 82 to the reformed gas and of air supplied from the air supply pipe 50 to the raw material gas can be controlled based on the temperature T3 of the reformed gas. By using these controls, the fuel reformer 20 can be efficiently operated.

In the fuel reformer 20 of the present invention, the amounts of air supplied from the air supply pipe 50, of the combustion fuel supplied to the vaporization section 30, of the combustion air, and of air supplied to the reformed gas by the air supply pipe 82 are controlled based on the temperatures T2 of the raw material gas, T1 of the fuel gas, or T3 of the reformed gas. However, the control is not limited to these methods, and can be performed by various other controls, including an overall control using all of the temperatures T2 of the raw material gas, T1 of the combustion fuel gas, and T3 of the reformed gas, and a control of supporting devices using temperatures T2 of the raw material gas, T1 of the combustion fuel gas, or T3 of the reformed gas.

Figure 31:
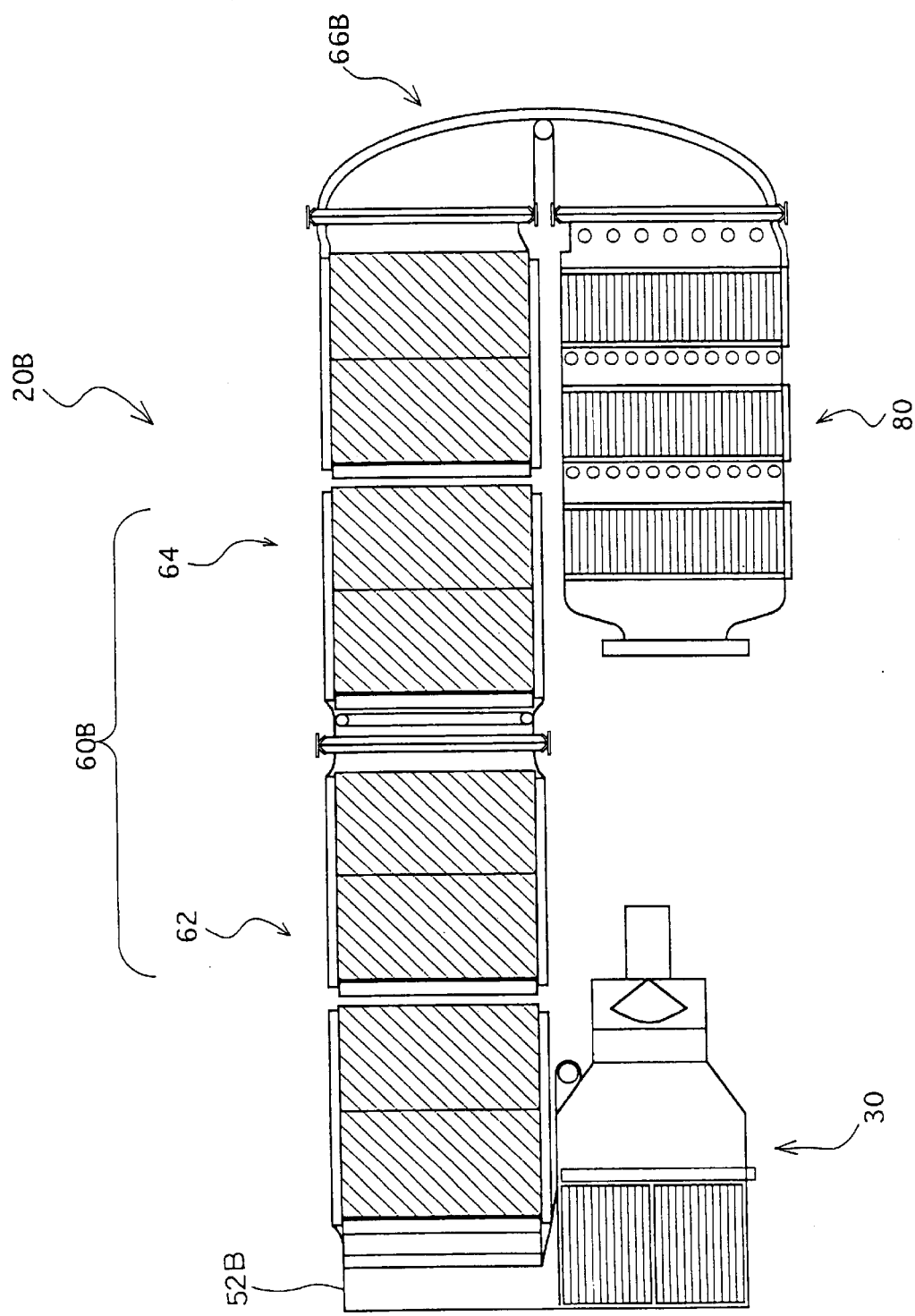
FIG. 31 is a cross sectional diagram showing one exemplified cross section of a fuel reformer 20B of an alternate embodiment.

In the fuel reformer 20 for mounting on a vehicle according to the embodiment, the front 62 and rear 64 sides of the reforming section are bent at an angle of 180, degrees and are interconnected. An alternate embodiment is also possible in which the vaporization section 30 and the reforming section 60B are connected by a swirl stirrer 52B with an angle of 180, degrees and the reforming section 60B and the CO reducing section 80 are connected by an interconnecting pipe 66B with an angle of 180, degrees, as shown in FIG. 31. The bending angle is not limited to 180, degrees, and can be any angle including 90 degrees etc. The bending position and angle can be determined based on the available space for mounting on the vehicle. Thus, even though in the fuel reformer 20 for mounting on a vehicle of the embodiment, the reforming section 60 is bent horizontally at 180, degrees so that the vaporization section 30 and the CO reducing section 80 are placed horizontally next to each other, it is also possible to bend the reforming section 60 vertically through 180, degrees so that the vaporization section 30 is placed on top of the CO reducing section 80 or, conversely, the vaporization section 30 is placed below the co reducing section 80.

Figure 32:
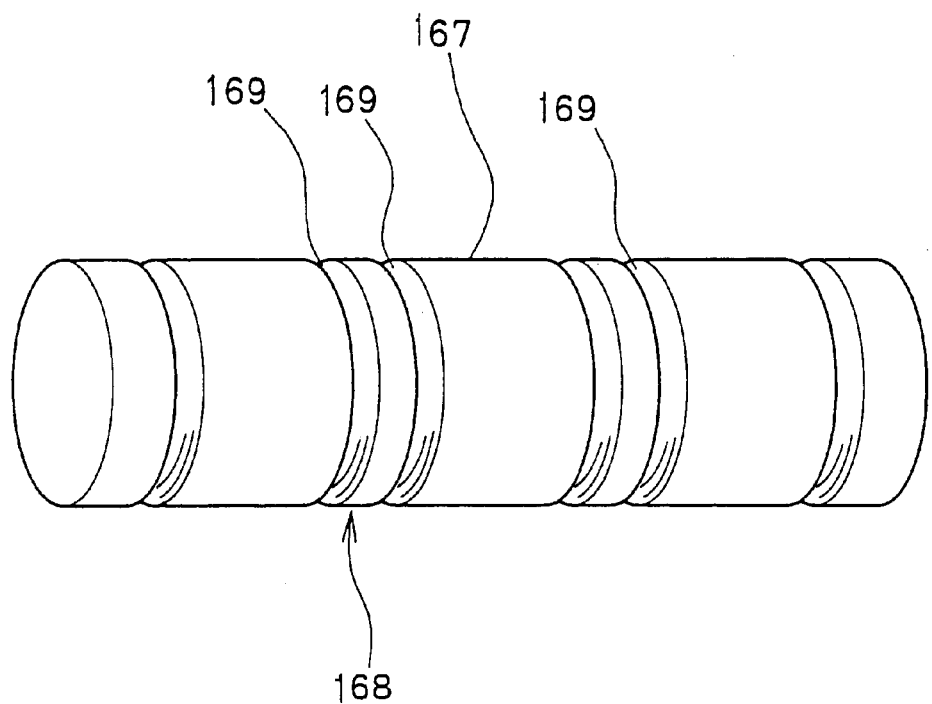
FIG. 32 is a diagram partially showing front and rear sides of a reforming section in an alternate embodiment including a liquid collecting section 168.
Figure 33:
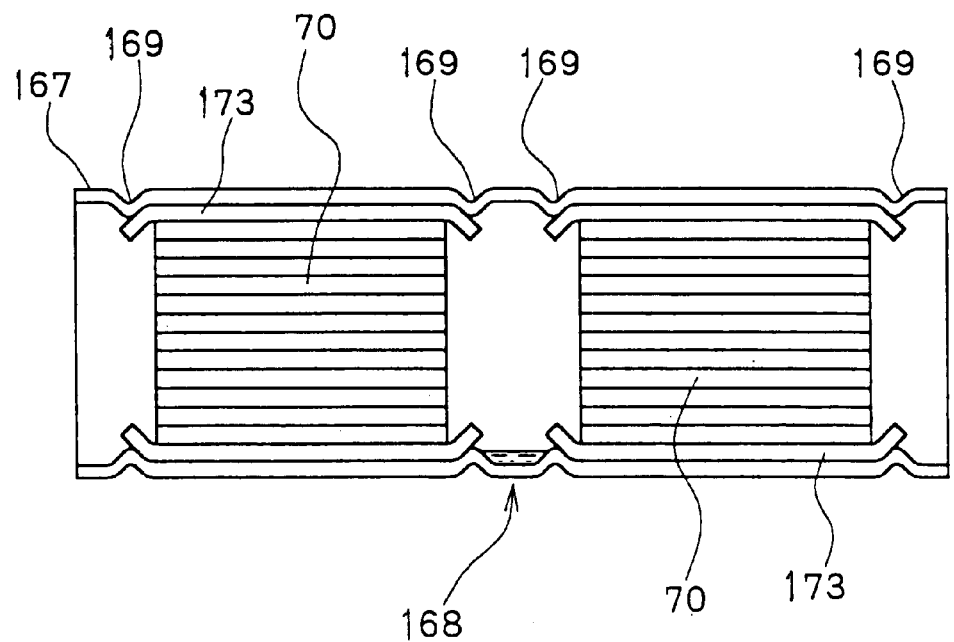
FIG. 33 is a diagram showing the operation of the liquid collecting section 168 in an alternate embodiment shown in FIG. 32 using a cross section of the reforming section along the gas flow in the vertical direction.

In the fuel reformer 20 for mounting on a vehicle according to the embodiment, the front 62 and rear 64 sides of the reforming section 60 are filled with a plurality of monolithic catalysts 70. It is also possible to include a liquid collecting section at the upstream of the monolithic catalysts 70 or between the monolithic catalysts 70. FIG. 32 shows a portion of the reforming front and rear sides of a reforming section having a liquid collecting section 168 and FIG. 33 shows the cross section of the reforming section. The liquid collecting section 168 comprises a channel 169 shaped convex to the inside and formed at a position corresponding to an end section of a monolithic catalyst 70 in the case 167, the case 167 being filled with the monolithic catalysts 70. As shown in FIG. 33, the liquid collecting section 168 operates as a liquid pool for collect methanol and water liquefied upstream of the monolithic catalyst 70 or between the monolithic catalysts 70. The channel 169 of the liquid collecting section 168 also acts as a holding member using a holding mat 173 for holding the monolithic catalysts 70 so that the catalysts do not move in the axial direction. By providing a liquid collecting section 168 on the case 167 of the reforming section, even when a portion of the raw material gas is liquefied, degradation of the catalyst carried on the monolithic catalysts 70 and of the performance of the monolithic catalyst 70 due to the liquid can be prevented. Moreover, because the liquid collecting section 168 also acts as a holding member for the monolithic catalyst 70, damage due to movements of the monolithic catalysts 70 can also be prevented.

In the fuel reformer 20 for mounting on a vehicle according to the embodiment, the heaters 58 and 79 are configured to obtain heat by a partial oxidation reaction of methanol. The heaters can also be configured to be electric heaters etc. which supply heat without the partial oxidation of methanol.

Figure 34:
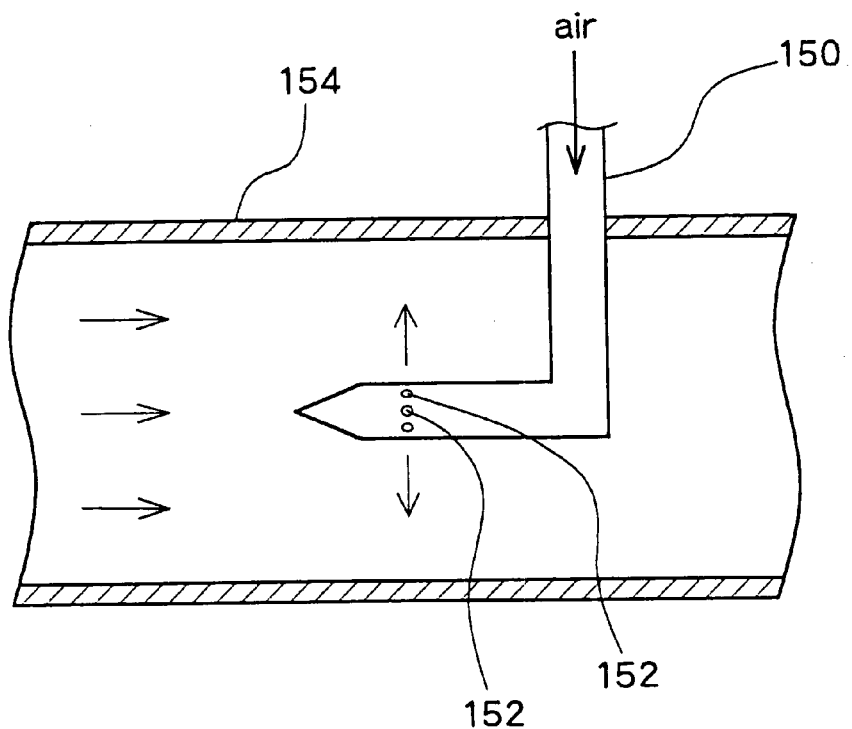
FIG. 34 is a diagram schematically showing an air mixing structure in a cross section along the flow of the reforming raw material.
Figure 35:
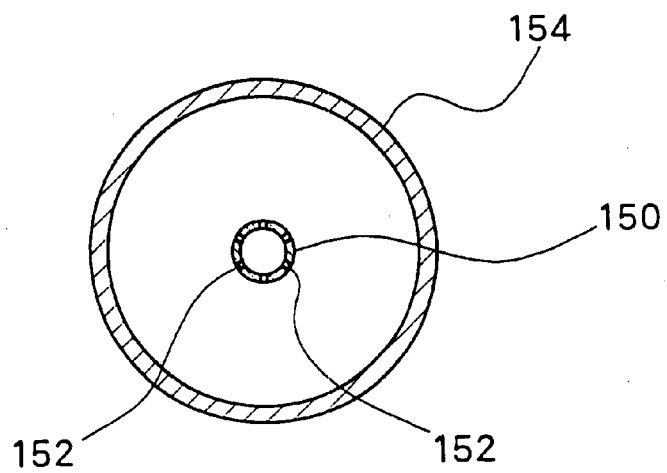
FIG. 35 is a cross sectional view of the air mixing structure in a direction perpendicular to the reformed gas flow.

In the fuel reformer 20 for mounting on a vehicle according to the embodiment, vaporized reforming raw material and air are mixed by a swirl stirrer 52. It is also possible to configure the device so that other stirrer is used for mixing, such as stirring by a bypass flow wall and stirring by rotating a propeller. Air supply and mixing can also be performed by an air mixing structure, such as shown in FIGS. 34 and 35, instead of mixing by the swirl stirrer 52. FIG. 34 shows the cross section of an air mixing structure along the flow of the reforming raw material and FIG. 35 shows the cross section of the air mixing structure perpendicular to the flow of the reformed gas. This air mixing structure, as show in the figures, comprises an air supply pipe 150 approximately in the middle of a mixing chamber 154, the air supply pipe 150 having its head opposing the flow of the reforming raw material within the mixing chamber 154. A plurality of nozzles 152 are provided on the air supply pipe 150 around its head and air is injected from these plurality of nozzles 152 to the reforming raw material. In this air mixing structure, by disturbing the flow of the reforming raw material within the mixing chamber 154 by injecting air from these nozzles 152, air is uniformly mixed with the reforming raw material. The head of the air supply pipe 150 has a streamlined shape in order to avoid pressure loss etc. by introduction of the air supply pipe 150. With this air mixing structure, because the precision of making the nozzles 152 and of the placement of the air supply pipe 150 has a small effect on the mixing efficiency, manufacture of these can be simplified with the manufacturing cost reduced. Also, because the air supply pipes do not significantly block the flow of the reforming raw material, back pressure can be reduced. The structure to be used is not limited to a structure which mixes air with the reforming raw material, but any structure which supplies one type of gas into another and mixes these two gases can be used as the air mixing structure. For example, the air supply pipe 82 of the CO reducing section can be used also for supplying air to the reformed gas. Even though this air mixing structure uses only one air supply pipe 150, a structure with a plurality of air supply pipes placed in the mixing chamber 154 is also possible. The position of the nozzles is not limited to the head of the air supply pipe 150, but the nozzles can be provided at a plurality of locations along the axis of the air supply pipe 150. Even though a cylindrical pipe has been used as an air supply pipe 150, the cross sectional shape of the air supply pipe is not limited to a circular shape and can be any shape including a rectangle and a polygon.

In the fuel reformer 20 for mounting on a vehicle according to the embodiment, the sections are fastened by a V-shaped band 90. It is also possible to fasten normal flanges using a plurality of bolts.

Figure 36:
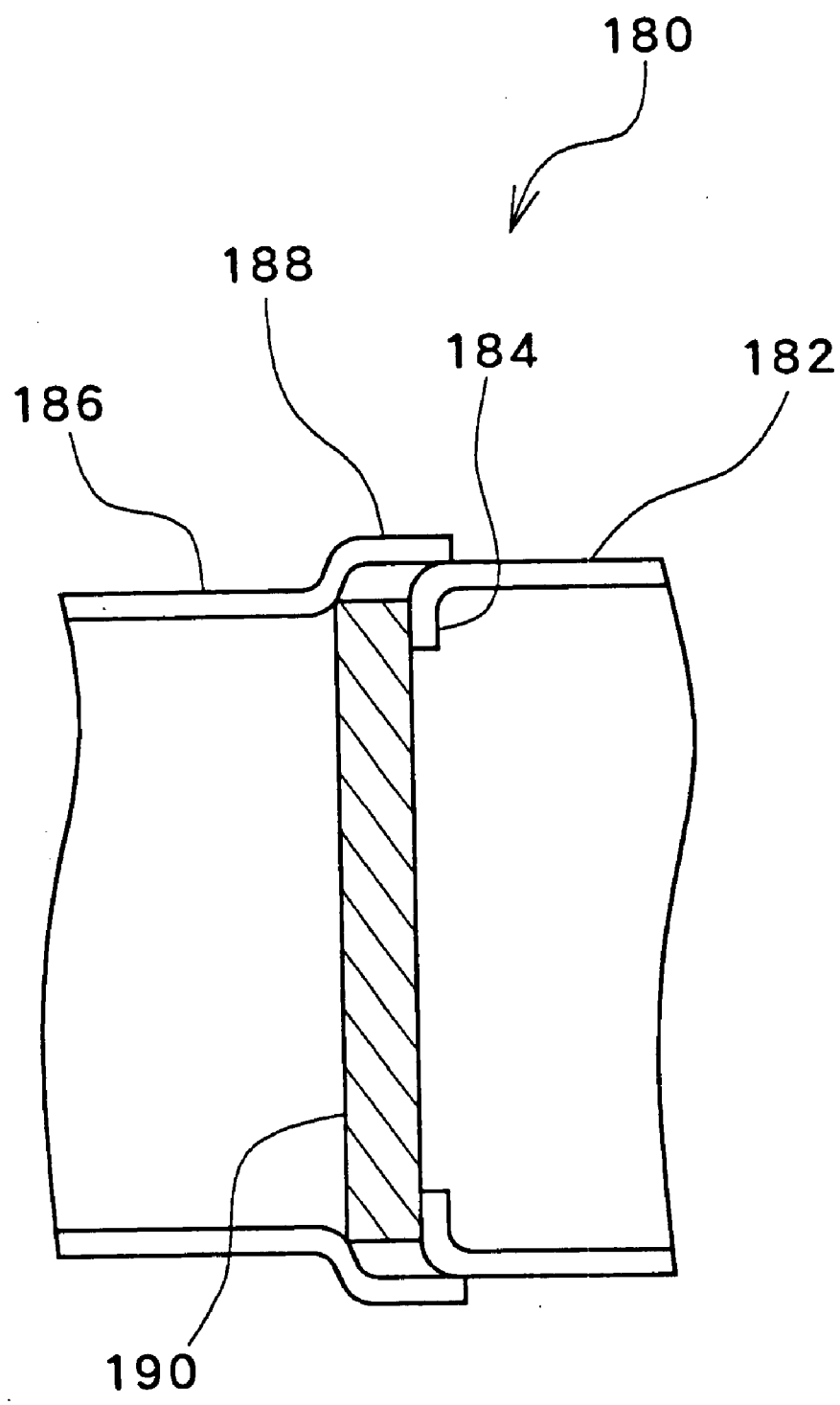
FIG. 36 is a structural diagram showing one example of a member holding structure 180 for holding a gasket 190.

In the fuel reformer 20 for mounting on a vehicle according to the embodiment, the connections between the vaporization section 30 and the reforming section 60 and between the reforming section 60 and the CO reducing section 80, each of which is provided as a separate unit are performed by simply fastening flanges 96 and 97 by a V-shaped band 90. However, the connections may be performed using other members such as, for example, a member holding structure for holding gaskets. FIG. 36 shows one example of a member holding structure 180 for holding a gasket 190 at the time of connection. As shown in the figure, the member holding section 180, holds the gasket 190 by pinching it using a member pressing section 184 formed by processing a member 182 with its ends bent inside and an opening 188 formed by processing a member 186 with its ends widely opened. The ends of the opening 188 are formed to contact the member 182 so that the ends of the opening 188 are connected to the member 182 by welding while the gasket 190 is pinched inside. In this manner, the positioning of the gasket 190 can be easily performed and the gasket 190 can be easily mounted. Here, members 182 and 186 correspond to the case of the vaporization section 30, reforming section 60, or CO reducing section 80. In the member holding structure 180 shown in FIG. 36, the members 182 and 186 are connected by welding. It is also possible to provide flanges similar to those of the embodiment to use at the positions to be welded and to connect the members by fastening using a V-shaped band.

Figure 37:
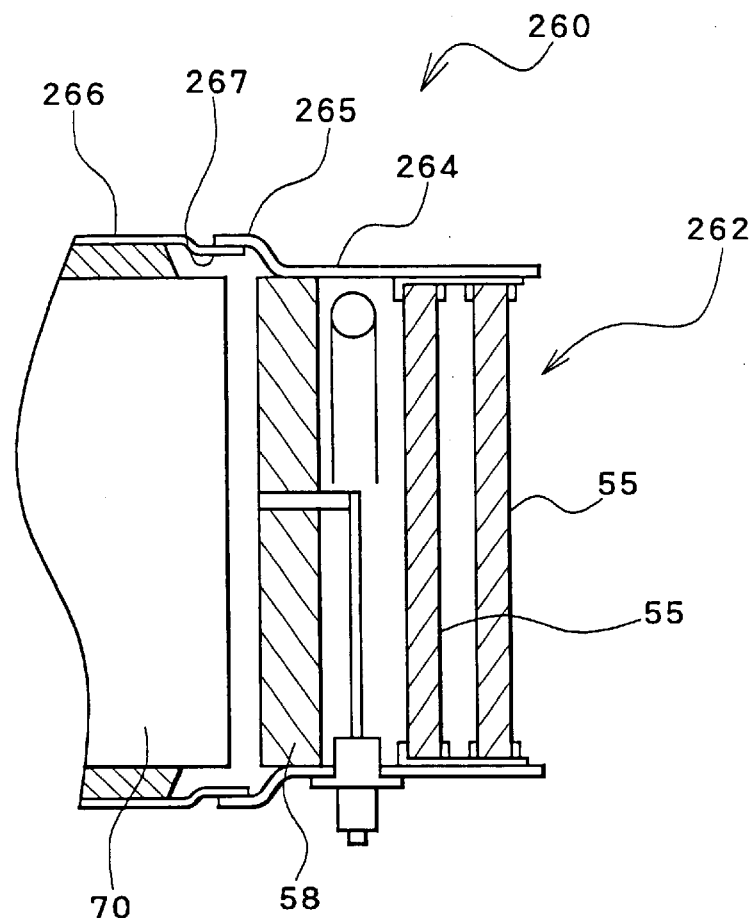
FIG. 37 is a diagram exemplifying a portion of a reforming section 260 constructed from a plurality of units.
Figure 38:
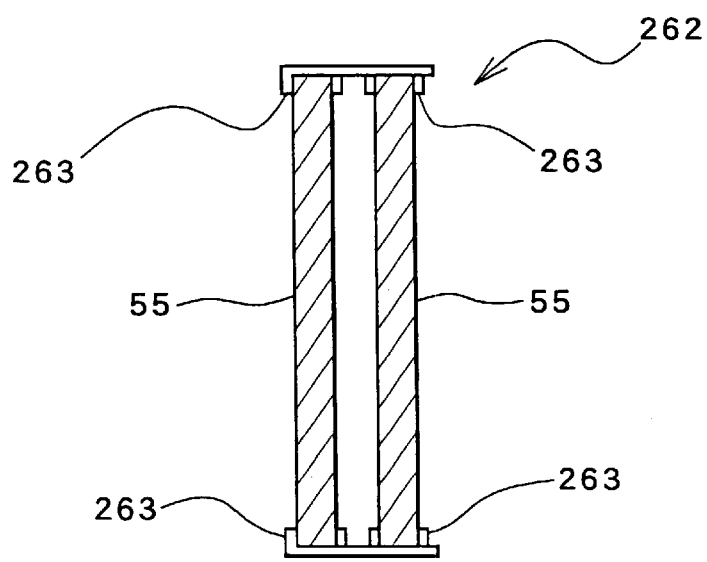
FIG. 38 is a structural diagram schematically showing a structure of a pressure adjusting unit 262.

In the fuel reformer 20 for mounting on a vehicle according to the embodiment, one unitized reforming section 60 is used, but the reforming section 60 may also be constructed from a plurality of units. FIG. 37 shows a reforming section 260 constructed from a plurality of units. The reforming section 260, as shown in the figure, comprises a pressure adjusting unit 262 having two pressure adjusting plates 55, a heating unit 264 having a heater 58, and a catalyst unit 266 having a monolithic catalyst 70. In the pressure adjusting unit 262, as shown in FIG. 38, a mounting section 263 is provided for mounting two pressure adjusting plates 55, and the pressure adjusting unit 262 is constructed by mounting two pressure adjusting plates 55 on the mounting section 263. In the heating unit 264, as shown in FIG. 37, a wide opening 265 is formed at the mounting end to the catalyst unit 266 so that the catalyst unit 266 can be connected by welding in a condition where the end section 267 of the catalyst section 266 is held inside. Moreover, the heating unit 264 is formed such that it can secure the pressure adjustment unit 262 and the heating unit 264 can be fixed by welding with the unit secured. In a reforming section 260 thus constructed, the pressure adjusting plates 55 and the heater 58 can be more precisely placed compared to a spinning process while placing the pressure adjusting plates 55 and heater 58, and the ease of assembly can be improved. In FIG. 37, this configuration is applied to the entrance of the raw material gas in the reforming section 260. However, it may also be applied to the entrance of the gas flow in the rear side 64 of the reforming section 60. The reforming section is not the only section that can be constructed from a plurality of units and the vaporization section 30 and CO reducing section 80 can be similarly constructed.

Figure 39:
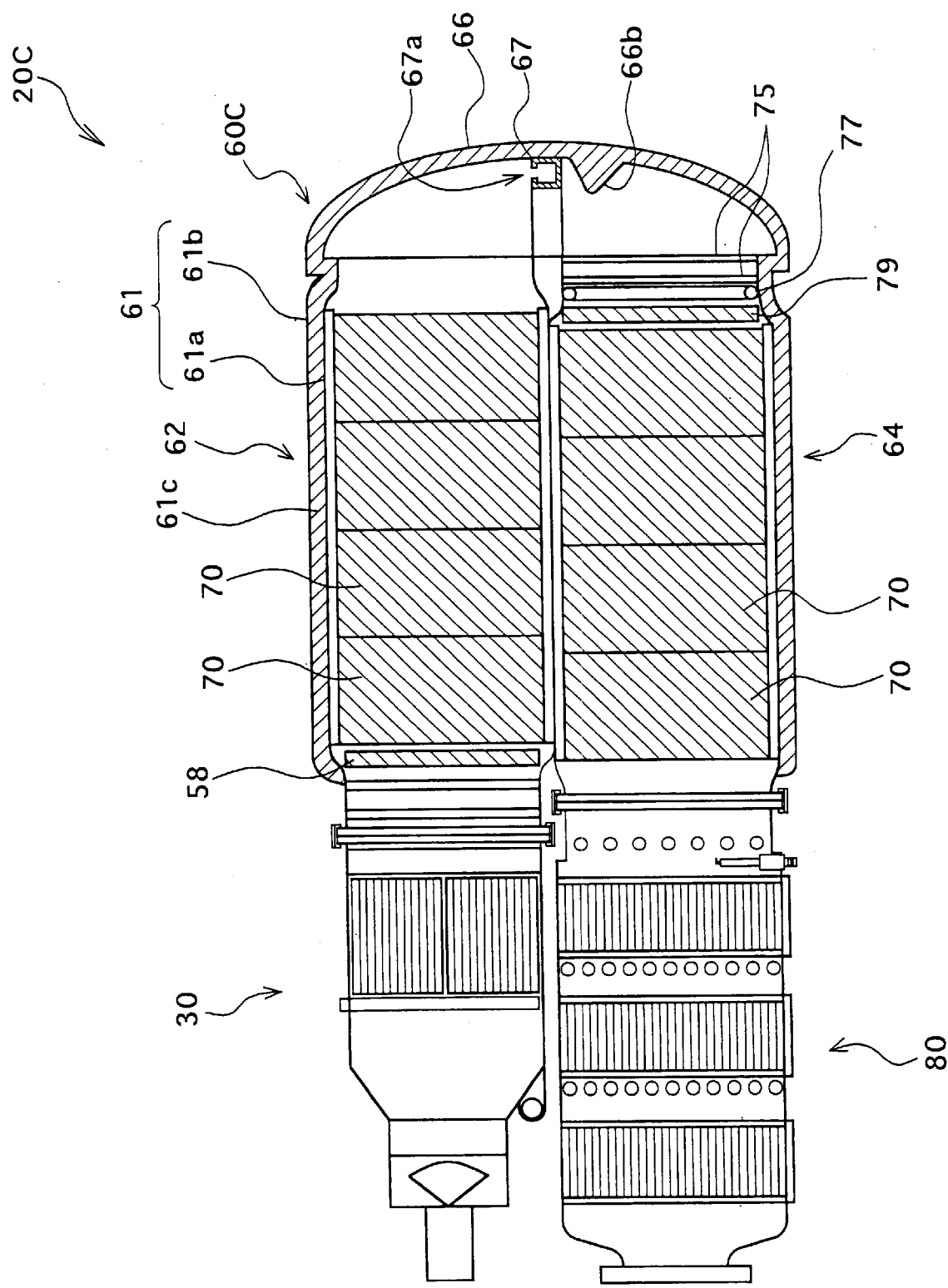
FIG. 39 is a structural diagram schematically showing the structure of the fuel reformer 20C of an alternate embodiment which has a reforming section 60C insulated by a casing 61 having a double layered structure.

In the fuel reformer 20 for mounting on a vehicle according to the embodiment, the cross section of each of the cells of the monolithic catalyst 70 has a rectangular shape, but it is also possible for each cell of the monolithic catalyst to have other shapes including a triangle and a hexagon. Even though the insulation layer 74 is formed by filling the cells at the outer edge of the monolithic catalysts 70 with a filler member 72, it is also possible to form an insulation layer by separate material wrapped around the monolithic catalyst 70, or to form an insulation layer by using a casing 61 which has double layered structure such as a fuel reformer 20C of an alternate embodiment shown in FIG. 39. In this double layered structure 61, the space 61c between the inner casing 61a and outer casing 61b acts as an insulation layer. In this case, the insulation layer 61c can also be a vacuum insulation layer.

Figure 40:
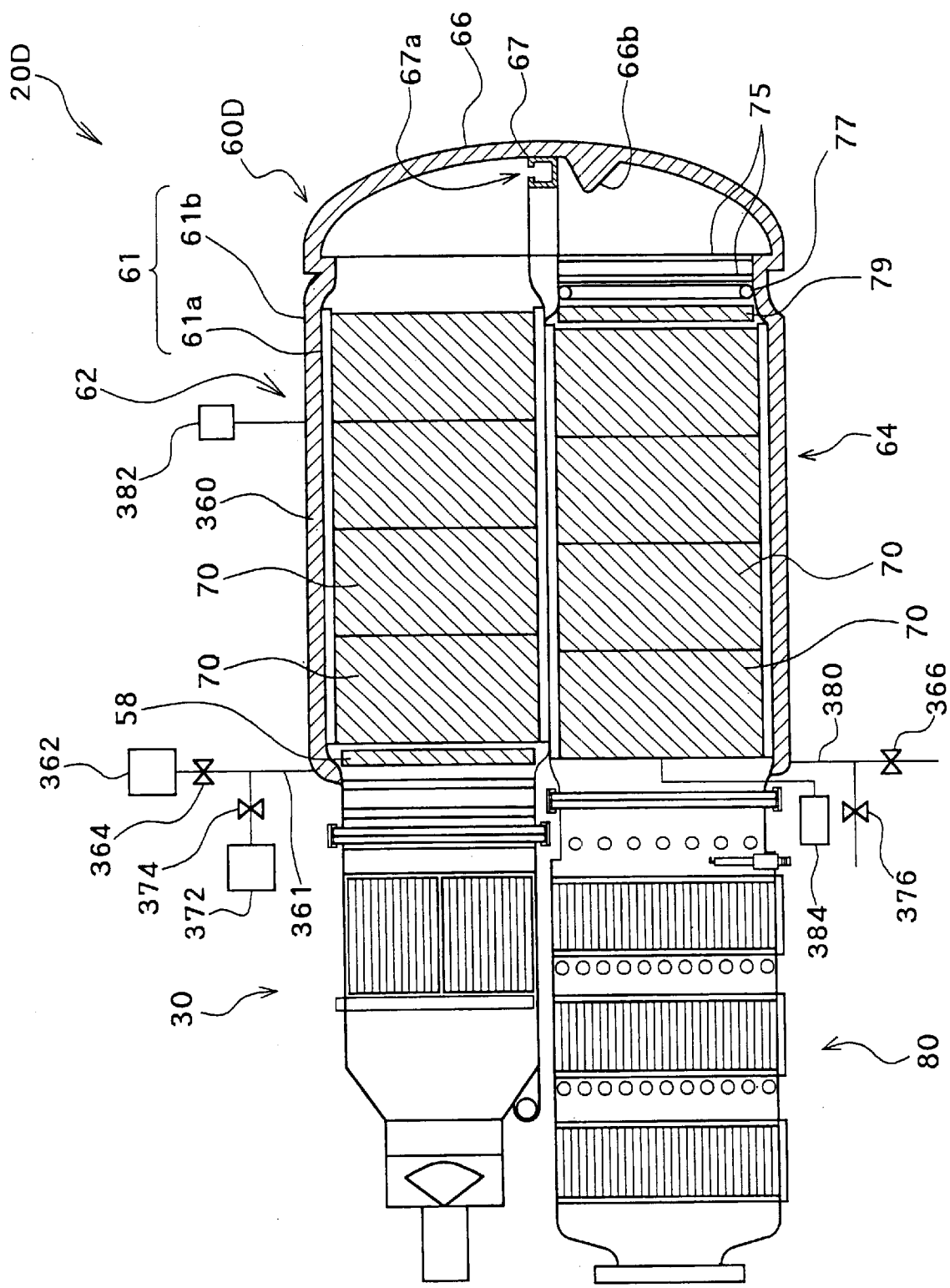
FIG. 40 is a structural diagram schematically showing the structure of the fuel reformer 20C of an alternate embodiment in which the monolithic catalysts 70 are heated by using heating catalyst.

In the fuel reformer 20 for mounting on a vehicle of the present embodiment, by providing a heater 58 at the entrance of the reforming section 60, the monolithic catalyst 70 is heated at the time of start-up by using heat generated by a partial oxidation reaction of methanol. However, the monolithic catalyst 70 can also be heated at the time of start-up by other methods. FIG. 40 schematically shows a structure of a fuel reformer 20D according to an alternate embodiment in which the monolithic catalyst 70 is heated by using a heating catalyst. As shown in the figure, in the fuel reformer 20D of the alternate embodiment, the casing 61 of the reforming section 60D is constructed as a double layered structure. The space between the inner casing 61a and outer casing 61b is filled with heating catalysts 360 (for example, iron, copper, or zinc) which generate heat by oxidation when oxygen-containing gas such as air is supplied. Around the entrance for the raw material gas in the casing 61, a supply pipe 361 is provided. The supply pipe 361 is connected to an oxygen-containing gas supply 362 which can supply oxygen-containing gas through an electromagnetic valve 364 and a deoxidizing gas supply 372 which can supply deoxidizing gas for deoxidizing the heating catalyst 360 through an electromagnetic valve 374. Around the exit of the reformed gas in the casing 61, a discharge pipe 380 is provided which can change the discharging destination through an electromagnetic valve 366 and an electromagnetic valve 376. In this alternate embodiment, the oxygen-containing gas supply 362 is a blower for supplying air and the deoxidizing gas supply 372 supplies fuel gas. In other words. The raw material gas remaining in the reforming section, after termination of the operation is instructed, is reformed and the obtained fuel gas is used as the deoxidizing gas.

Figure 41:
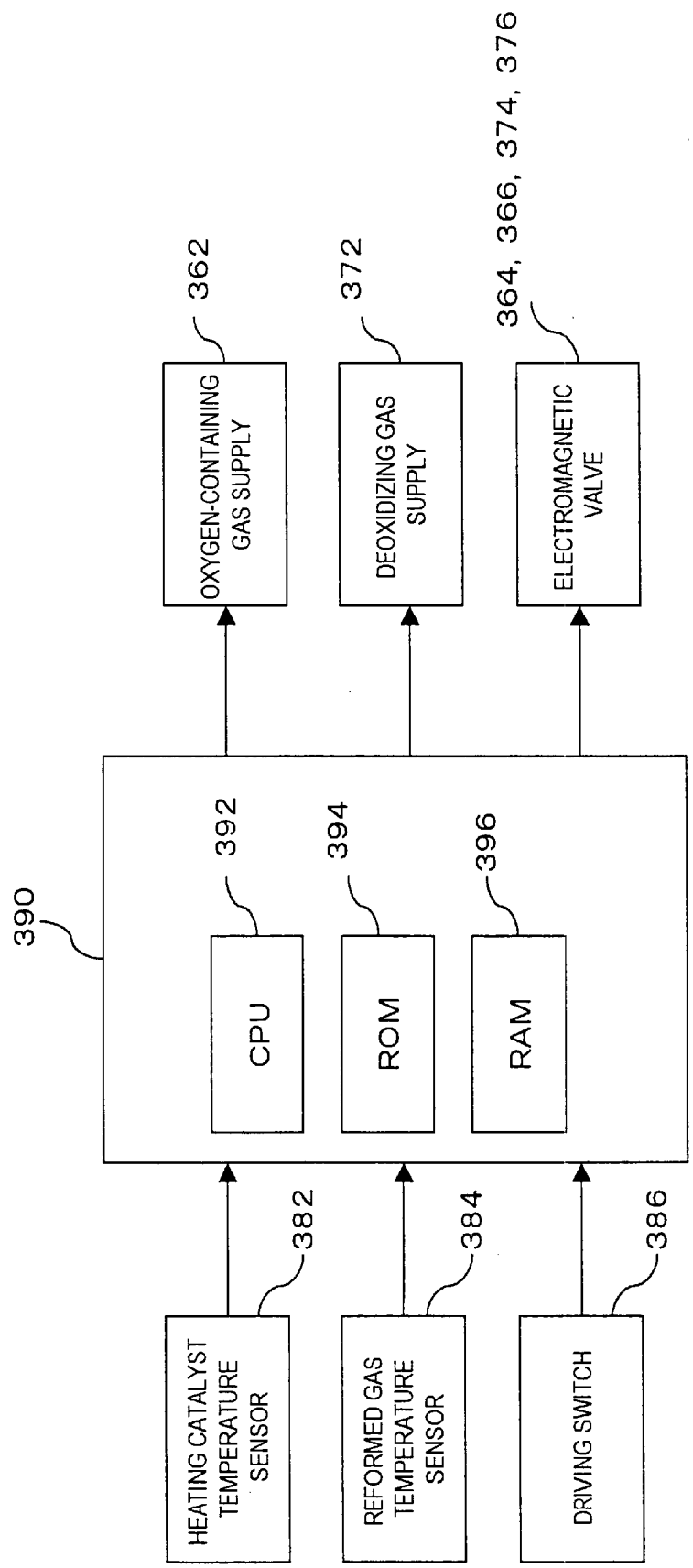
FIG. 41 is a structural diagram showing one example of an electrical structure for temperature control of a reforming section 60D having an electric control unit 390 at its core.

The reforming section 60D of the fuel reformer 20D of the alternate embodiment is also provided with a heating catalyst temperature sensor 382 for detecting the temperature of the heating catalyst 360 and a reformed gas temperature sensor 384 for detecting the temperature of the reformed gas. The reformed gas temperature sensor 384 is provided around the exit of the reforming section 60D. The temperature of the monolithic catalyst 70 of the reforming section 60D is controlled by an electric control unit 390, which is not shown in FIG. 40. FIG. 41 shows one example of the electric structure for temperature control of the reforming section 60D having the electric control unit 390 as its core. As shown in the figure, the electric control unit 390 is constructed as a microprocessor with CPU 392 at its core, and further comprises a ROM 394 for storing process program, a RAM 396 for temporarily storing data, and input/output ports (not shown). To the electric control unit 390, temperature Ts of the heating catalyst 360 from the heating catalyst temperature sensor 382, temperature Tp of the reformed gas from the reformed gas temperature sensor 384, and switch signals from the driving switch 386 for instructing the fuel reformer 20D to start or terminate its operation are input via the input ports. From the electric control unit 390, driving signals to the oxygen-containing gas supply 362, deoxidizing gas supply 372, and electromagnetic valves 364, 366, 374, and 376 are output via the output ports.

Figure 42:
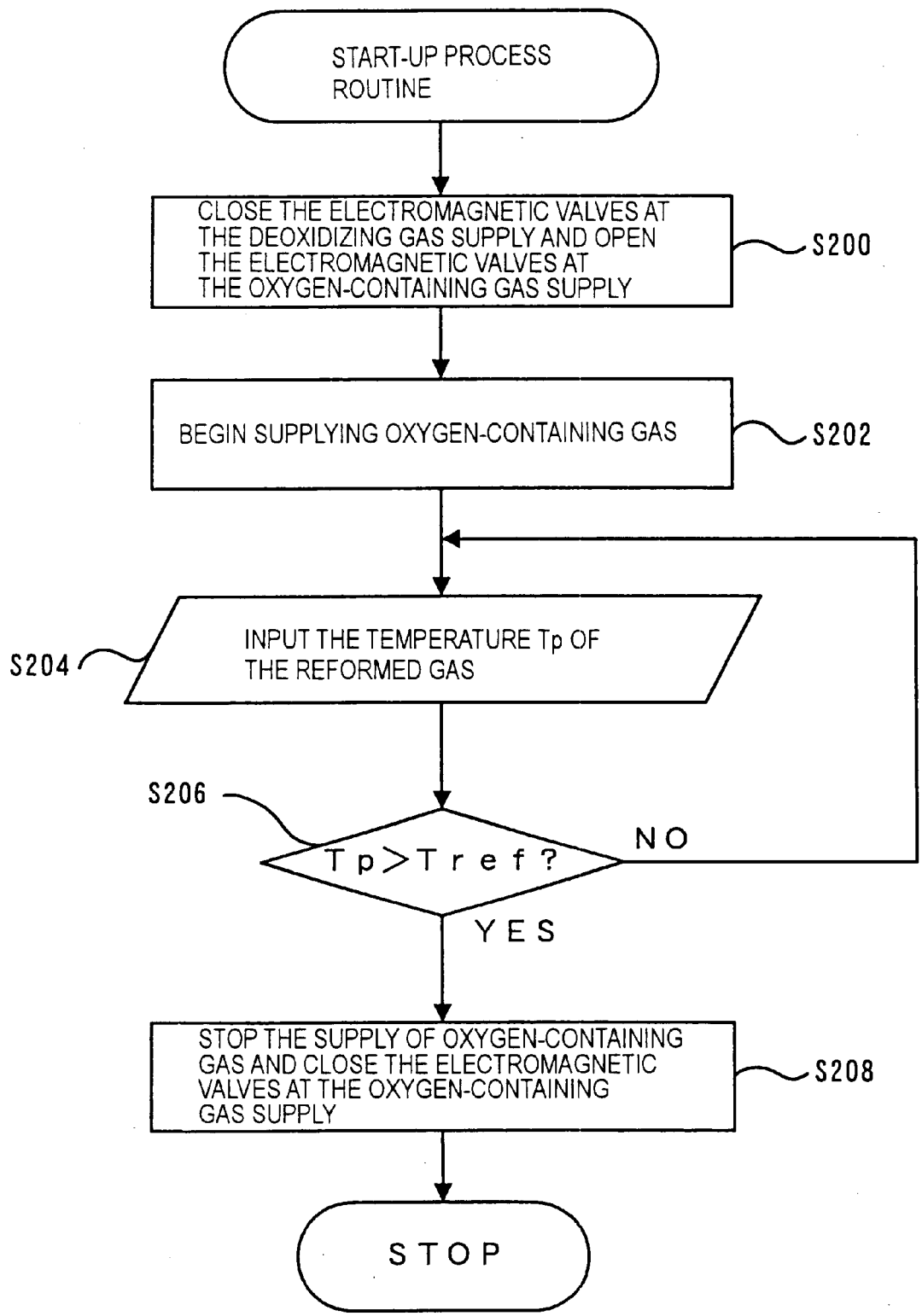
FIG. 42 is a flowchart showing one example of the start-up process routine executed by the electric control unit 390 of the fuel reformer 20D of an alternate embodiment.

The operations of the fuel reformer 20D of the alternate embodiment, especially the operation for heating the monolithic catalyst 70 at the time of start-up and the terminating operation are described hereinafter. FIG. 42 is a flowchart showing one example of the start-up process routine which can be executed by the electric control unit 390 at the time of start-up of the fuel reformer 20D. This routine is executed when the driving switch 386 is turned on.

When the start-up process routine is executed, CPU 392 of the electric control unit 390 first closes the electromagnetic valves 374 and 376 at the deoxidizing gas supply 372 and opens the electromagnetic valves 364 and 366 at the oxygen-containing gas supply 362 (step S200), and executes the process to begin supplying oxygen-containing gas (step S202). Supply of the oxygen-containing gas begins by supplying air to the heating catalyst 360 by driving the blower. With this air supply, the heating catalyst 360 is oxidized and generates heat, thereby beginning heating of the monolithic catalyst 70.

Then, the temperature Tp of the reformed gas detected by the reformed gas temperature sensor 384 is read (step S204) and the read temperature Tp of the reformed gas is compared to a threshold value Tref (step S206). The threshold value Tref is set at a minimum temperature at which the monolithic catalyst 70 is activated or at a temperature slightly higher than the minimum temperature. When the temperature Tp of the reformed gas is less than the threshold value Tref, it is determined that the monolithic catalyst 70 is not sufficiently warmed up, and the routine jumps back to step S204 for reading the temperature Tp of the reformed gas. When the temperature Tp of the reformed gas exceeds the threshold value Tref, on the other hand, it is determined that the warm up is complete, supply of the oxygen-containing gas is stopped, the electromagnetic valves 364 and 366 at the oxygen-containing gas supply are closed (step S208), and the routine is completed.

According to a fuel reformer 20D of an alternate embodiment executing such a start-up process routine, by supplying oxygen-containing gas (air) to the heating catalyst 360 at the time of start-up, the reforming section 60D can be quickly warmed up.

Figure 43:
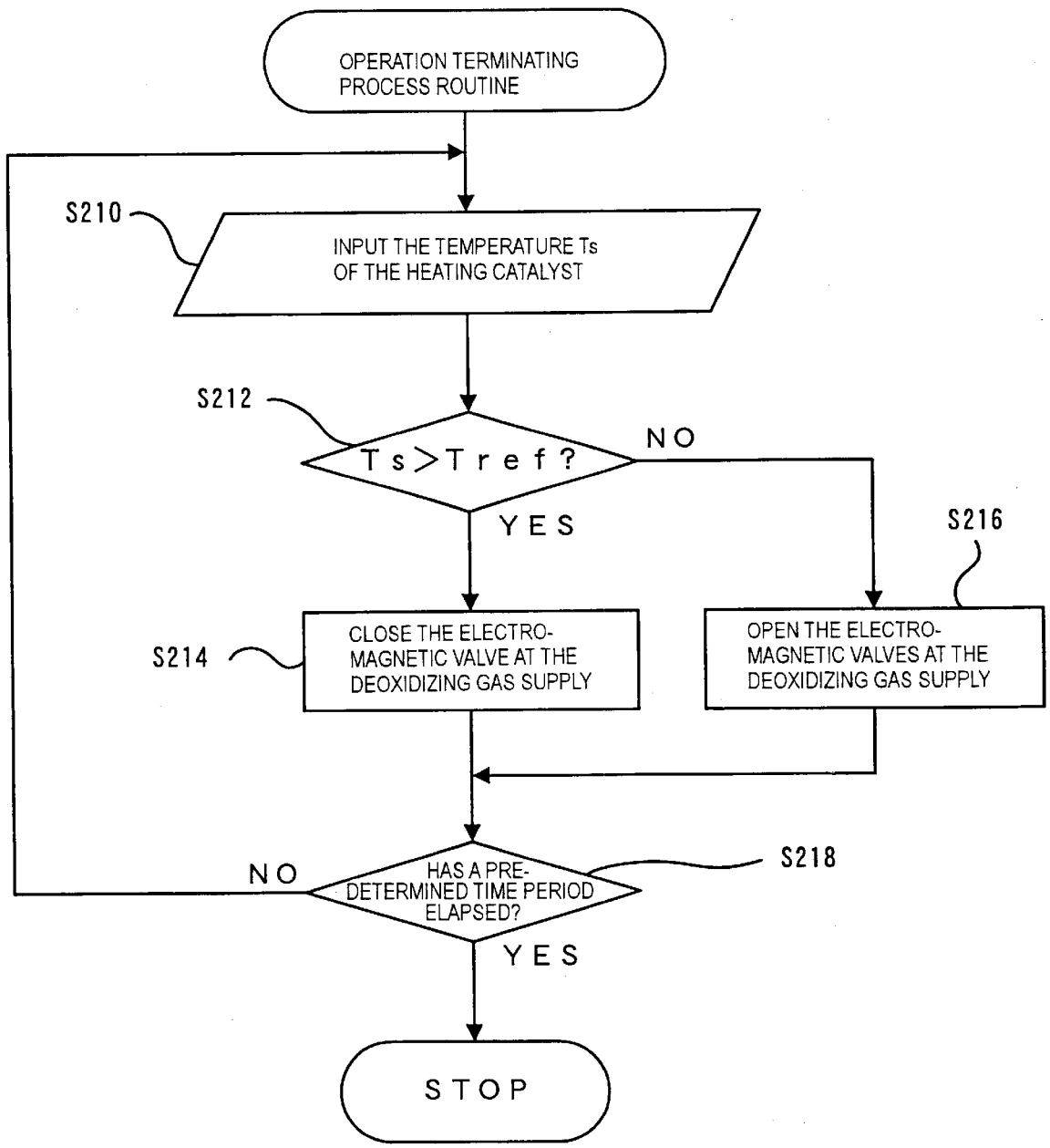
FIG. 43 is a flowchart showing one example of the termination process routine executed by the electric control unit 390 of the fuel reformer 20D of an alternate embodiment.

FIG. 43 is a flowchart showing one example of the operation terminating process routine executed by the electric control unit 390 of the fuel reformer 20D in the alternate embodiment. This routine is executed when the driving switch 386 is turned off. When the operation terminating process routine is executed, the CPU 392 of the electric control unit 390 first reads the temperature Ts of the heating catalyst 360 detected by the heating catalyst temperature sensor 382 (step S210) and executes a process to compare the read temperature Ts of the heating catalyst 360 with a threshold value Tref (step S212). Here, the threshold value Tref is identical to the threshold value Tref used for the start-up process routine.

When the temperature Ts of the heating catalyst 360 is higher than the threshold value Tref, the electromagnetic valves 374 and 376 at the deoxidizing gas supply 372 are closed (step S214) and when the temperature Ts of the heating catalyst 360 is lower than the threshold value Tref, the electromagnetic valves 374 and 376 at the deoxidizing gas supply are opened (step S216). In this alternate embodiment, as described above, fuel gas obtained by reforming raw material gas remaining in the fuel reformer 20D after termination of the operation is instructed is used as the deoxidizing gas. Thus, when the electromagnetic valves 374 and 376 at the deoxidizing gas supply 372 are opened, fuel gas is supplied to the heating catalyst 360 and when the electromagnetic valves 374 and 376 are closed, the supply of fuel gas to the heating catalyst 360 is stopped. The fuel gas supply is controlled based on the temperature Ts of the heating catalyst 360 in order to maintain the monolithic catalyst 70 at its activating condition. Even when the driving switch 386 is turned off and the supply of the reforming raw material is stopped, raw material gas vaporized at the vaporization section 30 still remains in the reformer and unreacted raw material gas still remains in the reforming section 60D. Thus, by controlling the temperature based on the temperature Ts of the heating catalyst 360, the operation of the reformer can be stopped with the remaining raw material gas reformed to fuel gas. As described before, when the fuel gas is supplied to the heating catalyst 360, the oxidized heating catalyst 360 is deoxidized by hydrogen.

Then, the CPU determines if a predetermined time has elapsed after the driving switch 386 is turned off (step S218). If the predetermined time has not elapsed, the process jumps back to step S210. If a predetermined time has elapsed, the process is completed. The predetermined time period is set as a time period required for all of the raw material gas remaining in the vaporization section 30 and unreacted raw material gas in the reforming section 60D to be reformed to the fuel gas, and is determined by factors such as the size of the fuel reformer 20D.

According to a fuel reformer 20D of the alternate embodiment executing such an operation terminating process routine, by supplying deoxidizing gas (fuel gas) to the heating catalyst 360 at the termination, the heating catalyst 360 can be deoxidized so that the heating catalyst 360 can be used for the next warm up. Moreover, fuel gas obtained by reforming unreacted raw material gas is used, and thus, it is not necessary to supply separate deoxidizing gas. Furthermore, the fuel gas obtained from the unreacted raw material gas can be effectively processed.

In the fuel reformer 20D of the alternate embodiment, air is used as the oxygen-containing gas. However, any gas can be used which can oxidize the heating catalyst 360. In the fuel reformer 20D of the alternate embodiment, fuel gas obtained by reforming unreacted raw material gas by the fuel reformer 20D is used as the deoxidizing gas, but other deoxidizing gas can also be used.

In the fuel reformer 20D of the alternate example, heating catalyst 360 is provided in the space between the inner casing 61a and outer casing 61b of the casing 61 having a double layered structure, but it is also possible to provide a heater which generates heat by supplying electric power.

In the fuel reformer 20 for mounting on a vehicle according to the embodiment and in the fuel reformers 20B, 20C, and 20D according to the alternate embodiments, methanol is used as a hydrocarbon fuel, but a saturated hydrocarbon such as methane, an unsaturated hydrocarbon such as ethylene or acetylene, and an alcohol such as ethanol can be also used. In the fuel reformer 20 for mounting on a vehicle according to the embodiment, air is used as the oxygen-containing gas, but any gas containing oxygen, including pure oxygen, can be used.

Even though the preferred embodiment of the present invention has been described, the explanation is not intended to limit the scope of the invention and various modifications can be practiced within the scope of the present invention.

What is claimed is:

1. A fuel reformer for mounting on a vehicle, comprising
   a vaporization section for vaporizing reforming raw material including water and hydrocarbon fuel,
   a reforming section for reforming raw material gas including said vaporized reforming raw material to a reformed gas rich in hydrogen by a reforming reaction, and
   a carbon monoxide reducing section for reducing carbon monoxide concentration in said reformed gas to obtain fuel gas, wherein
   said reforming section performs said reforming reaction by making said material gas flow in a direction parallel to the floor surface of the vehicle.

2. A fuel reformer according to claim 1, wherein
   said carbon monoxide reducing section reduces carbon monoxide concentration in said reformed gas by making said reformed gas flow in a direction parallel to the floor surface of the vehicle.

3. A fuel reformer according to claim 1, wherein
   said vaporization section vaporizes said reforming raw material by making said reforming raw material flow in a direction different from the flow of said raw material gas at said reforming section.

4. A fuel reformer according to claim 3, wherein said different direction is an orthogonal direction.

5. A fuel reformer according to claim 1, wherein
   said vaporization section, said reforming section, and said carbon monoxide reducing section are connected in series in that order, with at least one bending section for bending in a predetermined angle.

6. A fuel reformer according to claim 5, wherein
   said predetermined angle is 180, degrees.

7. A fuel reformer according to claim 5, wherein
   said reforming section is divided into two sides, a front side an a rear side, and
   said bending section is provided between said front and rear sides of said reforming section.

8. A fuel reformer according to claim 5, wherein
   said bending sections are provided a s connecting sections, one connecting said vaporization section with said reforming section and another connecting said reforming section with said carbon monoxide reducing section.

9. A fuel reformer according to claim 5, wherein
   said vaporization section is provided adjacent to said carbon monoxide reducing section.

10. A fuel reformer according to claim 1, wherein
    said carbon monoxide reducing section heats said reforming raw material using heat generated by said reduction of carbon monoxide before said reforming raw material is supplied to said vaporization section.

11. A fuel reformer according to claim 10, wherein.
    said carbon monoxide reducing section heats said reforming raw material by making said reforming raw material flow in a direction orthogonal to the flow of said reformed gas.

12. A fuel reformer according to claim 10, wherein
    said carbon monoxide reducing section is formed in a rectangular prism shape.

13. A fuel reformer according to claim 1, wherein
    said vaporization section vaporizes said reforming raw material by heat exchanging with combustion gas flowing in a combustion catalyst layer carrying a combustion catalyst for combusting fuel.

14. A fuel reformer according to claim 13, wherein
    said vaporization section vaporizes said reforming raw material by making said reforming raw material flow in a direction orthogonal to the flow of said fuel and said combustion gas.

15. A fuel reformer according to claim 13, wherein
    said vaporization section is provided with said combustion catalyst layer in a portion of folded flow path.

16. A fuel reformer according to claim 13, wherein,
    said vaporization section is constructed into a rectangular prism shape.

17. A fuel reformer according to claim 13, further comprising
    a combustion gas temperature detector for detecting the temperature of said combustion gas, and
    first vaporization control means for controlling the operation of said vaporization section so that said detected temperature of combustion gas is at a target temperature, preset for said combustion gas.

18. A fuel reformer according to claim 1, further comprising a first oxygen-containing gas supplier for supplying oxygen-containing gas to said reforming raw material vaporized at said vaporization section to obtain said raw material gas.

19. A fuel reformer according to claim 18, wherein said first oxygen-containing gas supplier mixes said vaporized reforming raw material and said oxygen-containing gas by swirling.

20. A fuel reformer according to claim 18, wherein said first oxygen-containing gas supplier mixes said oxygen-containing gas by injecting in a direction perpendicular to the flow of said vaporized reforming raw material.

21. A fuel reformer according to claim 20, wherein said first oxygen-containing gas supplier has a supply pipe along the middle of the flow of said vaporized reforming raw material, and mixes said oxygen-containing gas by injecting in a direction perpendicular to said flow from the outer surface of said supply pipe.

22. A fuel reformer according to claim 18, wherein said reforming section is divided into at least two sides, a front side and a rear side, and has an oxygen-containing gas supplier for supplying said oxygen-containing gas at outer edge near the entrance of said rear side.

23. A fuel reformer according to claim 18, wherein said reforming section performs said reforming reaction and a partial oxidation reaction for partially oxidizing a portion of hydrocarbon fuel contained in said reforming raw material using oxygen-containing gas supplied by said first oxygen-containing gas supplier.

24. A fuel reformer according to claim 18, further comprising a raw material gas temperature detector for detecting the temperature of said raw material gas, and second vaporization control means for controlling operation of said vaporization section so that the temperature of said detected raw material gas is at a target temperature, preset for said raw material gas.

25. A fuel reformer according to claim 24, wherein said second vaporization control means controls the amount of oxygen-containing gas supplied by said first oxygen-containing gas supplier.

26. A fuel reformer according to claim 18, further comprising, a second oxygen-containing gas supplier for supplying oxygen-containing gas to said reformed gas, a reformed gas temperature detector for detecting the temperature of said reformed gas, and supply gas amount control means for controlling the amount of oxygen-containing gas supplied by said second oxygen-containing gas supplier based on said detected temperature of reformed gas.

27. A fuel reformer according to claim 26, wherein said supply gas amount control means controls the supplied amount of oxygen-containing gas supplied by said first oxygen-containing gas supplier based on the temperature detected by said reformed gas temperature detector.

28. A fuel reformer according to claim 26, wherein said second oxygen-containing gas supplier supplies said oxygen-containing gas by injecting in a direction perpendicular to the flow of said reformed gas.

29. A fuel reformer according to claim 28, wherein said second oxygen-containing gas supplier has a supply pipe along the middle of the flow of said reformed gas and injects said oxygen-containing gas in a direction perpendicular to said flow from the outer surface of said supply pipe.

30. A fuel reformer according to claim 1, wherein said reforming section has an insulation layer at its outer edge.

31. A fuel reformer according to claim 1, wherein said reforming section has a monolithic catalyst formed by carrying catalysts on a monolith carrier.

32. A fuel reformer according to claim 31, wherein said monolithic catalyst has an insulation layer, constructed by filling the entrance for said raw material gas of the outermost cells of said monolithic catalyst.

33. A fuel reformer according to claim 31, wherein said monolithic catalyst has an insulation layer, constructed by filling the exit for said raw material gas of the outermost cells of said monolithic catalyst.

34. A fuel reformer according to claim 31, wherein said reforming section has a cylindrical shape.

35. A fuel reformer according to claim 31, wherein said monolithic catalyst is divided into a plurality of monolithic catalysts.

36. A fuel reformer according to claim 35, wherein said reforming section has liquid collecting sections between said plurality of divided monolithic catalysts filling the reforming section.

37. A fuel reformer according to claim 36, wherein said liquid collecting sections hold said monolithic catalysts.

38. A fuel reformer according to claim 36, wherein said liquid collecting section has a concave channel formed in the flow path of said raw material gas at said reforming section.

39. A fuel reformer according to claim 36, wherein said liquid pool section has a channel with a shape convex to the interior, on the case to be filled with said monolithic catalysts.

40. A fuel reformer according to claim 1, wherein said reforming section has a liquid collecting section near the entrance of said raw material gas.

41. A fuel reformer according to claim 40, wherein said liquid collecting section has a concave channel formed on the flow path of said raw material gas at said reforming section.

42. A fuel reformer according to claim 40, wherein said liquid collecting section has a channel with a shape convex to the interior, on the case to be filled with said monolithic catalysts.

43. A fuel reformer according to claim 40, wherein said liquid collecting section has at least a liquid pool for collecting liquid integrated with the case.

44. A fuel reformer according to claim 43, wherein said liquid pool is formed by pressing when said case is constructed.

45. A fuel reformer according to claim 43, wherein said liquid pool is formed by spinning when said case is constructed.

46. A fuel reformer according to claim 1, wherein said reforming section is divided into two sides, a front side and a rear side, and is provided with liquid collecting sections around the entrances of said front and rear sides.

47. A fuel reformer according to claim 46, wherein said liquid collecting section has a concave channel formed on the flow path of said raw material gas at said reforming section.

48. A fuel reformer according to claim 46, wherein said liquid collecting section has a channel with a shape convex to the interior formed on the case to be filled with said monolithic catalyst.

49. A fuel reformer according to claim 46, wherein said liquid collecting section has at least the liquid pool for collecting liquid integrated with the case.

50. A fuel reformer according to claim 49, wherein said liquid pool is formed by pressing when said casing is constructed.

51. A fuel reformer according to claim 49, wherein said liquid pool is formed by spinning when said casing is constructed..

52. A fuel reformer according to claim 1, wherein said carbon monoxide reducing section has a liquid collecting section around the entrance of said reformed gas.

53. A fuel reformer according to claim 52, wherein said liquid collecting section has a concave channel formed in the flow path of said reformed gas in said carbon monoxide reducing section.

54. A fuel reformer according to claim 52, wherein said liquid collecting section has at least the liquid pool for collecting liquid integrated with the casing.

55. A fuel reformer according to claim 54, wherein said liquid pool is formed by pressing when said casing is constructed.

56. A fuel reformer according to claim 54, wherein said liquid pool is formed by spinning when said casing is constructed.

57. A fuel reformer according to claim 1, wherein said reforming section has a raw material gas heater provided at the entrance of said raw material gas, for heating said raw material gas.

58. A fuel reformer according to claim 57, wherein said raw material gas heater partially oxidizes a portion of the hydrocarbon fuel contained in said raw material gas.

59. A fuel reformer according to claim 1, wherein said reforming section is divided into at least two sides, a front side and a rear side, and has an intermediate gas heater provided between said front and rear sides for heating the gas from said front side.

60. A fuel reformer according to claim 59, wherein said intermediate gas heater partially oxidizes a portion of hydrocarbon fuel contained in said raw material gas.

61. A fuel reformer according to claim 1, further comprising
a heater for heating said carbon monoxide reducing section.

62. A fuel reformer according to claim 61, wherein said heater comprises an igniter for combusting hydrogen contained in said reformed gas, and
said heater heats said carbon monoxide reducing section using the heat generated by said combustion of hydrogen.

63. A fuel reformer according to claim 1, wherein said reforming section comprises a dividing section for dividing said reforming section into at least two sides, a front side and a rear side, and a dividing section gas supplier for supplying oxygen-containing gas to said dividing section.

64. A fuel reformer according to claim 63, wherein said dividing section gas supplier disturbs the gas flow at said dividing section by supplying said oxygen-containing gas.

65. A fuel reformer according to claim 63, wherein said dividing section has a bending section which bends at a predetermined angle, and
said dividing section gas supplier is provided to contact the inner wall of an outer periphery of said bending section.

66. A fuel reformer according to claim 65, wherein said dividing section gas supplier has a plurality of nozzles for injecting said oxygen-containing gas at a predetermined angle to the gas flow at said bending section.

67. A fuel reformer according to claim 66, wherein said dividing section gas supplier is constructed by processing a pipe material.

68. A fuel reformer according to claim 66, wherein said dividing section gas supplier is constructed as a hollow structure by pressing.

69. A fuel reformer according to claim 66, wherein said dividing section gas supplier is constructed as a hollow structure by welding.

70. A fuel reformer according to claim 65, wherein said dividing section has a flow direction adjusting device for adjusting the gas flow at said bending section.

71. A fuel reformer according to claim 70, wherein said flow direction adjusting device is a channel formed in a convex shape to the inside at said bending section.

72. A fuel reformer according to claim 1 further comprising,
a heater for heating said reforming section, said heater provided to wrap around said reforming section.

73. A fuel reformer according to claim 72, wherein said reforming section has a double layered structure having an inner casing and an outer casing, and
said heater is placed in the space between said inner and outer casings of said reforming section having a double layered structure.

74. A fuel reformer according to claim 72, wherein said heater further comprises a heating element for generating heat by oxidation and an oxidizing gas supplier which can supply oxidizing gas to said heating element for oxidizing said heating element.

75. A fuel reformer according to claim 74, wherein said heater further comprises start-up control means for controlling said oxidizing gas supplier to supply said oxidizing gas to said heating element at the time of start-up of said reforming section.

76. A fuel reformer according to claim 74, wherein said heater further comprises a reforming temperature detecting sensor for detecting the temperature of said reforming section and oxidation control means for controlling supply of said oxidizing gas by said oxidizing gas supplier based on said detected temperature.

77. A fuel reformer according to claim 74, wherein said heater further comprises a deoxidizing gas supplier which can supply deoxidizing gas to said heating element for deoxidizing said heating element.

78. A fuel reformer according to claim 77, wherein said heater further comprises operation termination control means for controlling said deoxidizing gas supplier to supply said deoxidizing gas to said heating element at the termination of the operation of said reforming section.

79. A fuel reformer according to claim 78, wherein said deoxidizing gas supplier supplies fuel gas which is formed by reforming raw material gas remaining in the vaporization means and unreacted raw material gas remaining in the reforming section when termination of operation of the reforming section is instructed.

80. A fuel reformer according to claim 77, wherein said heater further comprises a heating element temperature detecting sensor for detecting temperature of said heating element and deoxidation control means for controlling supply of said deoxidizing gas by said deoxidizing gas supplier based on said detected temperature.

81. A fuel reformer according to claim 1, wherein said vaporization section, said reforming section, and said carbon monoxide reducing section are each provided as a separate unit, and has a connector for connecting to each of the sections.

82. A fuel reformer according to claim 81, wherein said connector is constructed from a flange and a V-shaped band for fastening said flange.

83. A fuel reformer according to claim 81, wherein said connector comprises a member holding structure for holding the member at the time of connection.

84. A fuel reformer according to claim 83, wherein said member holding structure is a structure for holding a gasket at the time of connection.

85. A fuel reformer according to claim 81, wherein at least one of said separately provided vaporization section, reforming section, and carbon monoxide reducing section is constructed from a plurality of separate units.

86. A fuel reformer according to claim 81, wherein said reforming section comprises a flow rate averaging section for averaging the flow rate of said raw material gas, a raw material gas heater section for heating said raw material gas, and a catalyst section having a catalyst for reforming supplied raw material gas, each of said sections provided as a separate unit.

87. A fuel reformer according to claim 1, wherein said reforming raw material is a liquid mixture of water and methanol, and said raw material gas is a mixture gas of said vaporized reforming raw material and oxygen-containing gas.

* * * * *